(12) United States Patent
Guo et al.

(10) Patent No.: US 12,429,686 B2
(45) Date of Patent: Sep. 30, 2025

(54) DIOPTER-ADJUSTABLE EYEPIECE OPTICAL SYSTEM AND HEAD-MOUNTED DISPLAY DEVICE

(71) Applicant: SHENZHEN NADE OPTICAL CO., LTD., Guangdong (CN)

(72) Inventors: Jianfei Guo, Guangdong (CN); Hongpeng Cao, Guangdong (CN); Huajun Peng, Guangdong (CN)

(73) Assignee: SHENZHEN NADE OPTICAL CO., LTD., Shenzhen (CN)

( * ) Notice: Subject to any disclaimer, the term of this patent is extended or adjusted under 35 U.S.C. 154(b) by 341 days.

(21) Appl. No.: 18/215,847

(22) Filed: Jun. 29, 2023

(65) Prior Publication Data
US 2023/0393383 A1 Dec. 7, 2023

Related U.S. Application Data

(63) Continuation of application No. PCT/CN2020/142174, filed on Dec. 31, 2020.

(51) Int. Cl.
*G02B 25/00* (2006.01)
*G02B 27/01* (2006.01)

(52) U.S. Cl.
CPC ....... *G02B 25/001* (2013.01); *G02B 27/0172* (2013.01)

(58) Field of Classification Search
None
See application file for complete search history.

(56) References Cited

U.S. PATENT DOCUMENTS

| 7,978,417 | B2 * | 7/2011 | Nishio | G02B 25/001 |
| | | | | 359/716 |
| 2017/0371147 | A1 * | 12/2017 | Cao | G02B 13/002 |
| 2019/0227285 | A1 * | 7/2019 | Wang | G02B 13/22 |

FOREIGN PATENT DOCUMENTS

| CN | 106526851 A | 3/2017 |
| CN | 105278109 B | 11/2017 |
| CN | 107683432 A | 2/2018 |
| CN | 108490592 A | 9/2018 |
| CN | 207882560 U | 9/2018 |
| CN | 107024766 B | 5/2019 |

\* cited by examiner

Primary Examiner — Edmond C Lau

(57) ABSTRACT

A diopter-adjustable eyepiece optical system and a head-mounted display device. The eyepiece optical system comprises a first lens group (T1), a second lens group (T2), and a third lens group (T3) which are sequentially arranged from a human eye (EYE) observation side to a micro image display (IMG) in an optical axis direction; the effective focal length of the first lens group (T1) is a positive value; the effective focal length of the second lens group (T2) is a negative value; and an optical surface (6), close to the micro image display (IMG), in the third lens group (T3) protrudes towards a direction of the micro image display (IMG). The first lens group (T1) is fixed relative to human eyes (EYE); the second lens group (T2) and the third lens group (T3) move towards a direction of the human eyes (EYE) along the optical axis.

15 Claims, 21 Drawing Sheets

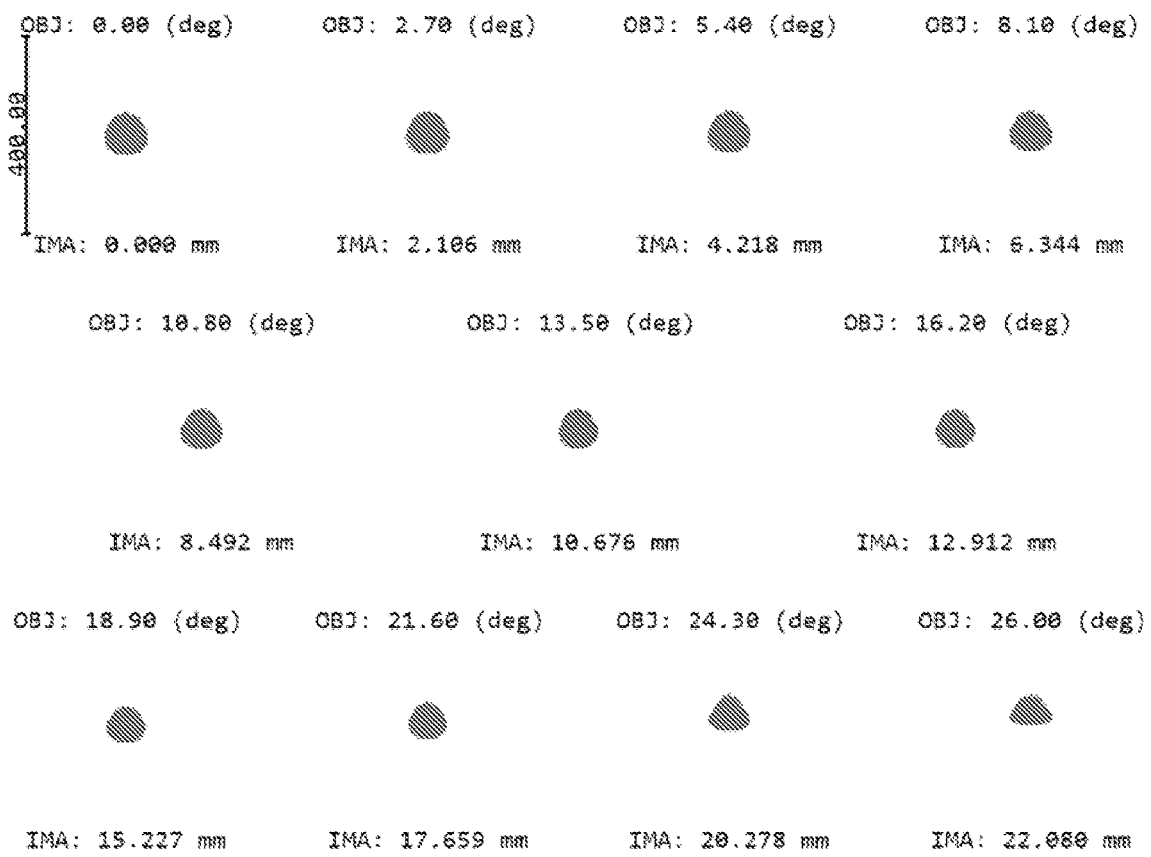
FIG. 2
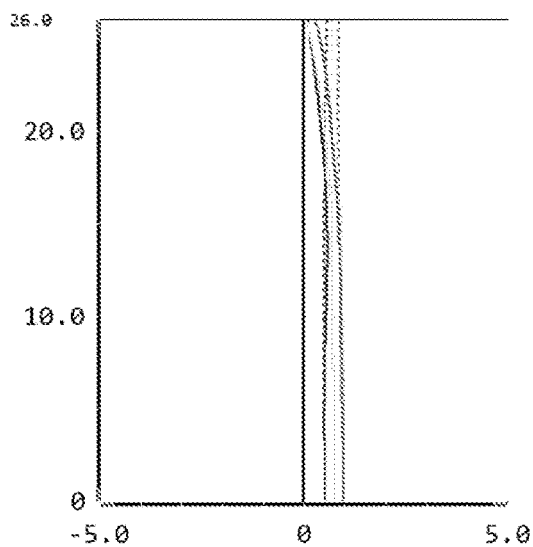
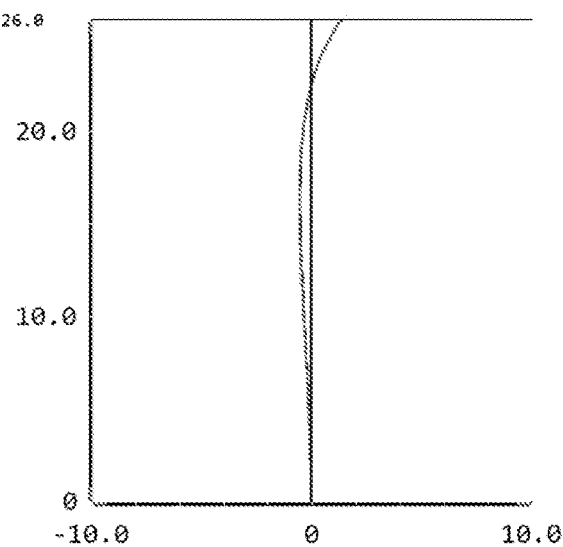
FIG. 3A          FIG. 3B

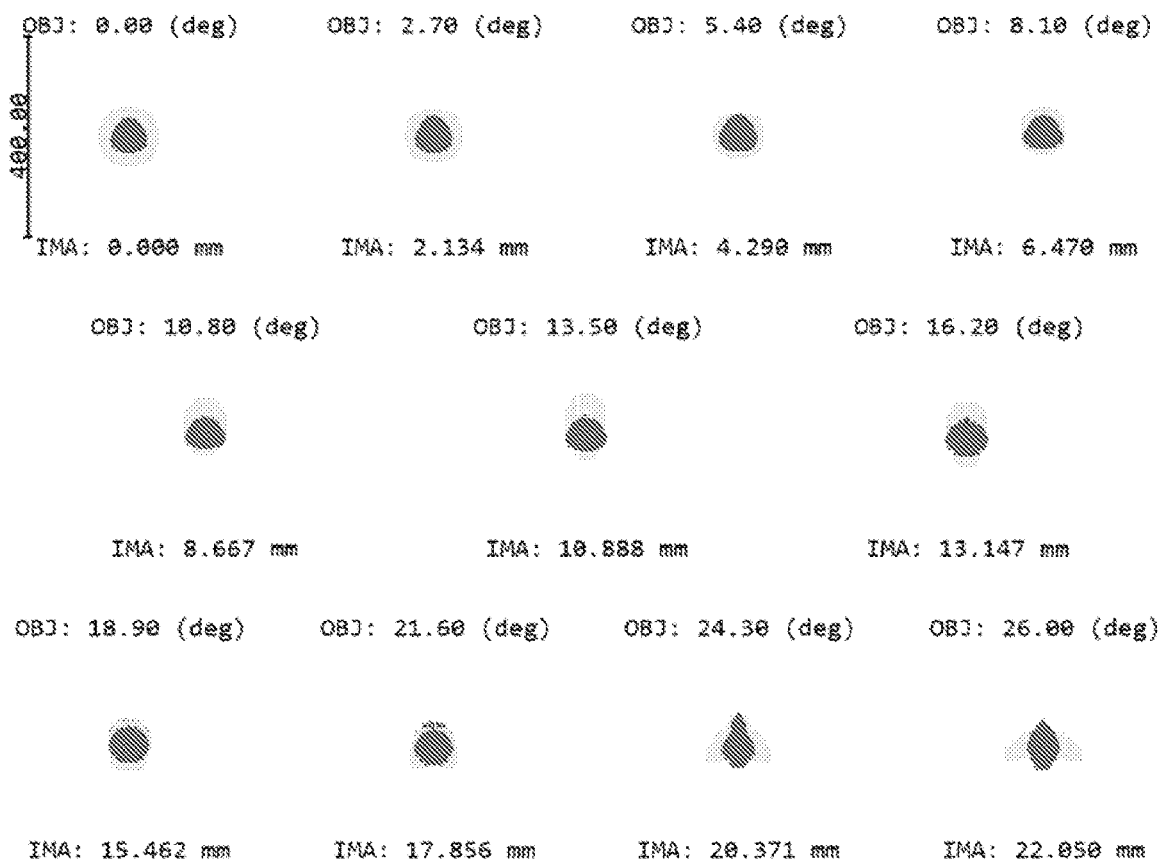
FIG. 10
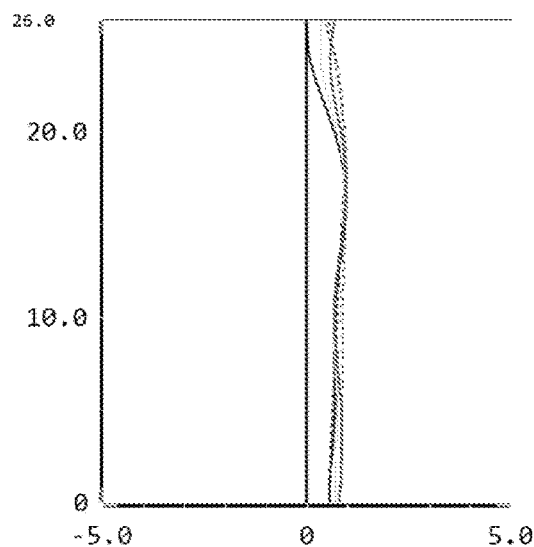
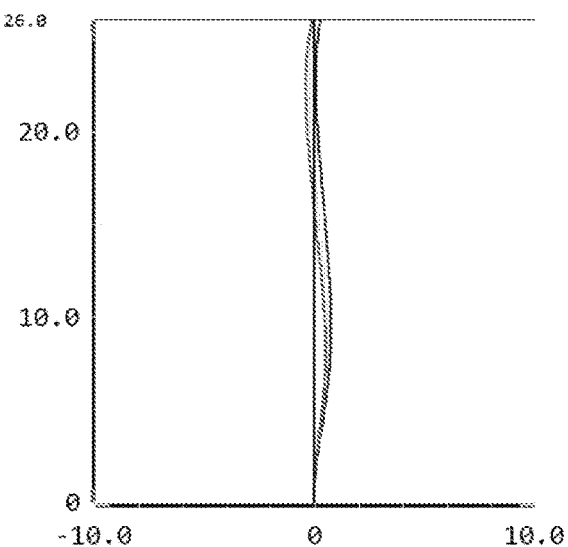
FIG. 11A  FIG. 11B

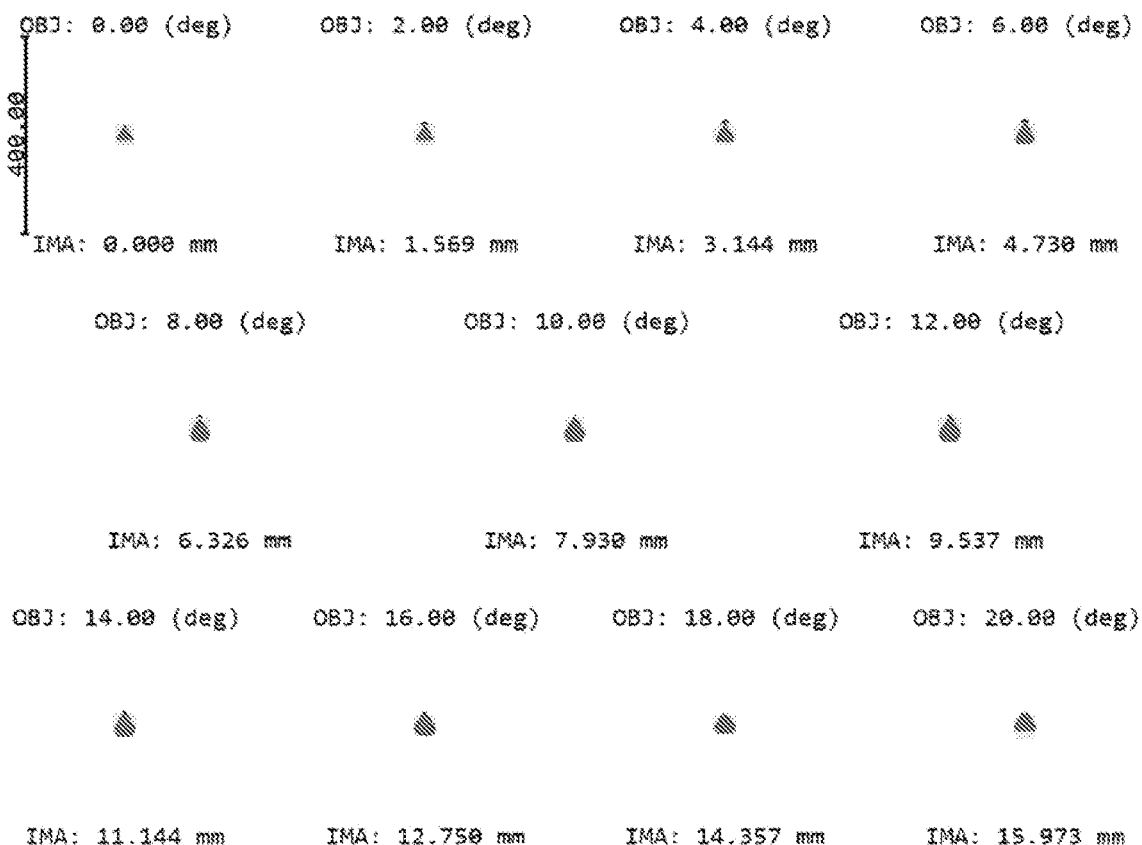
FIG. 26
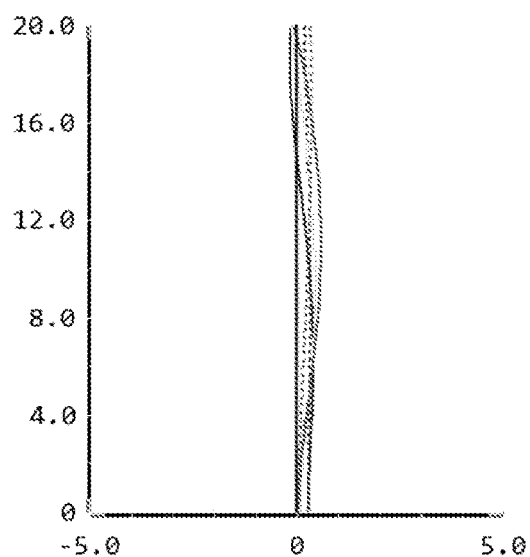
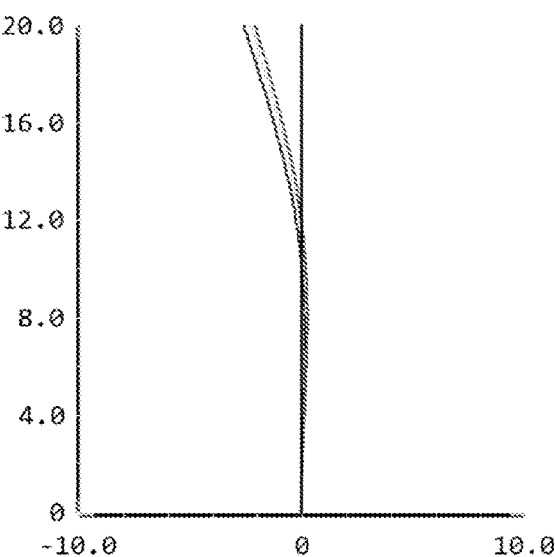
FIG. 27A                FIG. 27B

DIOPTER-ADJUSTABLE EYEPIECE OPTICAL SYSTEM AND HEAD-MOUNTED DISPLAY DEVICE

CROSS REFERENCE TO RELATED APPLICATIONS

The present application is a Continuation Application of PCT Application No. PCT/CN2020/142174 filed on Dec. 31, 2020, the contents of which are incorporated herein by reference in their entirety.

TECHNICAL FIELD

The present invention relates to the field of optical technologies, and more specifically, to a diopter-adjustable eyepiece optical system and a head-mounted display device.

BACKGROUND

With the continuous development of electronic devices towards microminiaturization, as well as the development of new computers, microelectronics, optoelectronic devices, and communication theories and technologies, wearable computing, a new model based on the "people-oriented" concept and "human-machine integration", has become possible. Applications are constantly emerging in fields such as military, industry, healthcare, education, and consumption. In a typical wearable computing system architecture, a head-mounted display device is a key component. The head-mounted display device directs the video image light emitted from a micro image display (e.g., a transmissive or reflective liquid crystal display screen, an organic electroluminescent light-emitting element, a DMD element) to the pupil of the user by optical technology to implement virtual magnified images in the near-eye range of the user, so as to provide the user with intuitive, visual images, video, text information. The eyepiece optical system is the core of the head-mounted display device, which realizes the function of displaying a micro image in front of human eyes to form a virtual magnified image.

The head-mounted display device develops in the direction of compact size, light weight, convenient wearing, and load reduction. Meanwhile, there are higher requirements for a larger optical field-of-view and a better optical imaging effect. At the same time, ensuring the thinness and light-weight and further expanding the consumer groups of head-mounted display products have become a new challenge.

In Patent Document 1 (Chinese Patent Publication No. CN107683432A), Patent Document 2 (Chinese Patent Publication No. CN107024766B), Patent Document 3 (Chinese Patent Publication No. CN105278109B), and Patent Document 4 (Chinese Patent Publication No. CN106526851A) an eyepiece optical system that employs a combination of a traditional optical spherical surface and an even-order aspherical face, wherein optical systems in Patent Document 1, Patent Document 2, Patent Document 3, and Patent Document 4 are all fixed focus optical systems, which cannot be zoomed at fixed points according to usage situations of different users. Although Patent Document 4 uses an eyepiece optical system having a combination of positive and negative lenses, it is prone to image offset during zooming, resulting in inconsistent images viewed by different users.

In Patent Document 5 (Chinese Patent Publication No. CN108490592A) and Patent Document 6 (Chinese Patent Publication No. CN207882560U), an eyepiece optical system employing zooming is provided, which ensures high-quality imaging; however, but the excessive number of lenses is increased the overall size and weight of the product, which is not conducive to a comfortable wearing experience, and the complex lens face shape is not conducive to mass production.

SUMMARY

The technical problem to be solved by the present invention is that the fact that existing optical systems are all fixed-focus optical systems, which are difficult to satisfy requirements of most consumers, at the same time, the weight of the optical system is too heavy and the volume thereof is too large. To solve the aforementioned defects of the existing technologies, a diopter-adjustable eyepiece optical system and a head-mounted display device are provided.

A technical solution adopted by the present invention to solve its technical problems is to construct an diopter-adjustable eyepiece optical system and a head-mounted display device, comprising a first lens group, a second lens group, and a third lens group which are sequentially arranged from a human eye observation side to a micro image display in an optical axis direction; an effective focal length of the first lens group is set to $f_1$, wherein $f_1$ is a positive value; an effective focal length of the second lens group is set to $f_2$, wherein $f_2$ is a negative value; and an optical surface, close to the side of the micro image display, in the third lens group protrudes towards a direction of the micro image display;

the first lens group is fixed relative to the human eyes; and when the focal length of the optical system is increased, the second lens group and the third lens group move towards the direction of the human eyes along the optical axis;

the effective focal length of the third lens group is set to $f_3$; the effective focal length of the optical system is set to $f_w$, and $f_1$, $f_2$, $f_3$, and $f_w$ satisfy the following relations (1), (2), and (3):

$$0.32 \leq f_1/f_w \leq 0.61 \quad (1);$$

$$-3.38 \leq f_2/f_w \leq -0.47 \quad (2); \text{ and}$$

$$2.84 \leq |f_3/f_w| \quad (3).$$

Further, the effective focal length of the first lens group is $f_1$, the effective focal length of the second lens group is $f_2$, and $f_1$ and $f_2$ satisfy the following relation (4):

$$-0.18 \leq f_1/f_2 \leq -0.70 \quad (4).$$

Further, a distance between an optical surface, close to the human eye side, in the first lens group and the micro image display in the optical axis direction of the system is set to $D_w$, the effective focal length of the optical system is set to $f_w$, and $D_w$ and $f_w$ satisfy the following relation (5):

$$1.02 \leq f_w/D_w \leq 1.54 \quad (5).$$

Further, a distance between the first lens group and the second lens group in the optical axis direction of the system is set to $D_{12}$; a distance between the second lens group and the third lens group in the optical axis direction of the system is set to $D_{23}$; wherein in a 0-diopter correction state of the eyepiece optical system, the distance between the first lens group and the second lens group in the optical axis direction of the system is set to $D_{120}$, and the distance between the second lens group and the third lens group in the optical axis direction of the system is set to $D_{230}$;

in an X-diopter correction state of the eyepiece optical system, the distance between the first lens group and the second lens group in the optical axis direction of the system is set to $D_{12X}$, and the distance between the second lens group and the third lens group in the optical axis direction of the system is set to $D_{23X}$, and $D_{120}$, $D_{230}$, $D_{12X}$, and $D_{23X}$ satisfy the following relation (6):

$$0.78 \leq (D_{23X} \times D_{230})/(D_{12X} \times D_{120}) \leq 2.74 \qquad (6).$$

Further, the first lens group comprises a first lens; and the first lens is a biconvex positive lens.

Further, the first lens group comprises a first lens and a second lens, and the first lens is a biconvex positive lens; the effective focal length of the first lens is set to $f_{11}$, the effective focal length of the first lens group is $f_1$, and $f_{11}$ and $f_1$ satisfy the following relation (7):

$$0.468 \leq f_{11}/f_1 \qquad (7)$$

Further, the material of the second lens is optical resin; and material properties of the second lens satisfy the following relation (8):

$$V_{d1} \leq 31 \qquad (8);$$

wherein the $V_{d1}$ is an Abbe number of the second lens on a line d.

Further, the curvature radius of the optical surface, close to the human eye side, in the first lens is set to $R_{110}$, the curvature radius of the optical surface, close to the side of the micro image display, in the first lens is set to $R_{111}$, and $R_{110}$ and $R_{111}$ satisfy the following relation (9):

$$0.1 \leq |R_{110}/R_{111}| \leq 1.83 \qquad (9).$$

Further, the second lens group comprises a third lens; and the third lens is a negative lens.

Further, the third lens group comprises a fourth lens; the curvature radius of an optical surface, far from the side of the micro image display, in the fourth lens is set to $R_{130}$, and the curvature radius of an optical surface, close to the side of the micro image display, in the fourth lens is set to $R_{131}$, and $R_{130}$ and $R_{131}$ satisfy the following relation (10):

$$0.71 \leq R_{130}/R_{131} \leq 0.80 \qquad (10).$$

Further, material properties of the fourth lens satisfy the following relations (11) and (12):

$$N_{d3} \geq 1.80 \qquad (11); \text{ and}$$

$$V_{d3} \leq 41 \qquad (12);$$

wherein the $N_{d3}$ is the refractive index of the fourth lens on the line d; and the $V_{d3}$ is an Abbe number of the fourth lens on the line d.

Further, the first lens group and the second lens group comprise one or more even-order aspherical face shapes; and the even-order aspherical face shape satisfies the following relation (13):

$$z = \frac{cr^2}{1+\sqrt{1-(1+k)c^2 r^2}} + \alpha_2 r^2 + \alpha_4 r^4 + \alpha_6 r^6 + \dots . \qquad (13)$$

A head-mounted display device is further provided in the present invention, comprising a micro image display and an eyepiece, wherein the eyepiece is located between human eyes and the micro image display, and the eyepiece is the eyepiece optical system according to any one of the foregoing contents.

Further, the micro image display is an organic electroluminescence light-emitting device.

Further, the head-mounted display device comprises two identical and symmetrically arranged eyepiece optical systems.

Beneficial effects of the present invention is that: a diopter-adjustable eyepiece optical system is provided, a combination of the first lens group being positive and the second lens group being negative is used, and the third lens group is arranged on the second lens group away from the human eye side. When the focal length of the optical system is increased, the second lens group being the negative lens group and the third lens group whose effective focal length is greater than the total focal length of the optical system move towards the human eye side, the distance between the first lens group and the second lens group is reduced, the distance between the third lens group and the micro image display is increased, and the distance between the second lens group and the third lens group is reduced. By means of optical zooming, users having different diopters can focus at fixed points according to usage situations of specific users, and the problem of image offset in the zooming process is avoided under the action of the third lens group, such that images having large field of view, high definition, no distortion, and no image offset are presented for the users, the consistency of images watched by different users is further ensured, the range of the users is greatly expanded, and the user experience is improved.

BRIEF DESCRIPTION OF DRAWINGS

To describe the technical solutions in the embodiments of the present invention or the prior art more clearly, the present invention will be further illustrated in the following with reference to accompanying drawings and examples. The accompanying drawings described in the following description are merely some example s of the present invention, and those of ordinary skill in the art can still derive other drawings from these accompanying drawings without creative efforts.

FIG. 2 is a spot array diagram of the eyepiece optical system according to t Example 1 of the present invention;

FIG. 3A is a plot of the field of the eyepiece optical system according to Example 1 of the present invention, and FIG. 3B is a plot of the distortion of the eyepiece optical system according to the first example of the present invention;

FIG. 10 is a spot array diagram of the eyepiece optical system according to Example 2 of the present invention;

FIG. 11A is a plot of the field of the eyepiece optical system according to Example 2 of the present invention, and FIG. 11B is a plot of the distortion of the eyepiece optical system according to Example 2 of the present invention;

FIG. 26 is a spot array diagram of the eyepiece optical system according to Example 4 of the present invention;

FIG. 27A is a plot of the field of the eyepiece optical system according to Example 4 of the present invention, and FIG. 27B is a plot of the distortion of the eyepiece optical system according to Example 4 of the present invention;

DETAILED DESCRIPTION OF THE EMBODIMENTS

Figure 1:
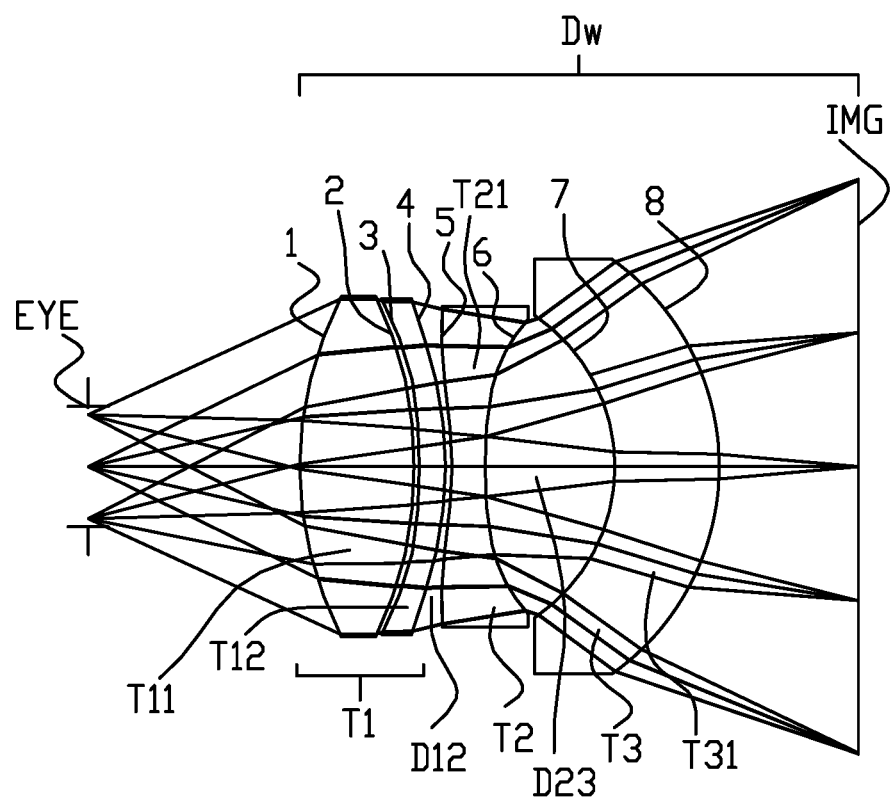
FIG. 1 is an optical path diagram of a 700-degree myopia eyepiece optical system according to Example 1 of the present invention.
Figure 4:
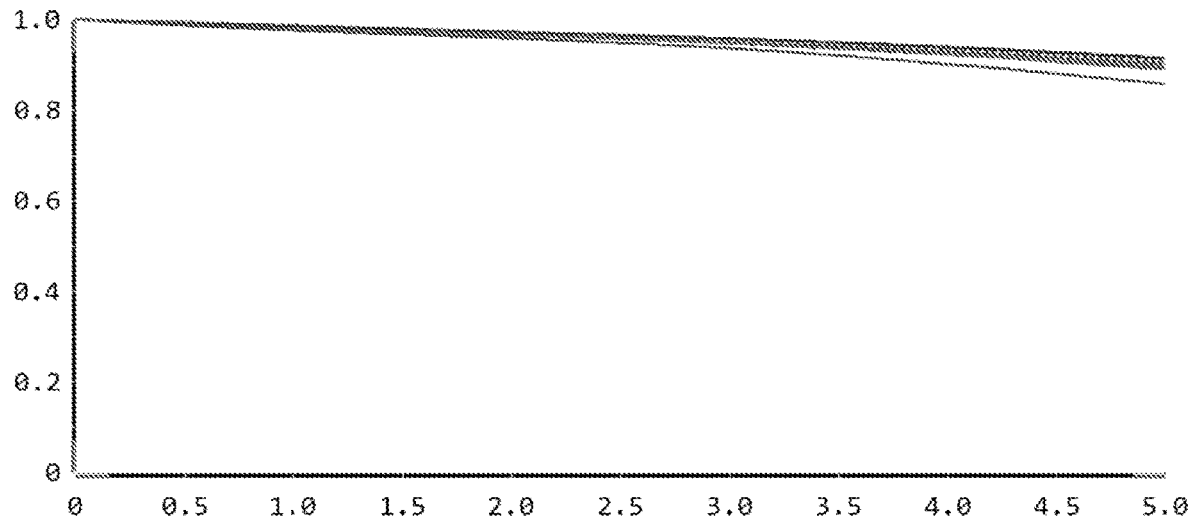
FIG. 4 is a plot of the MTF of the 700-degree myopia eyepiece optical system according to Example 1 of the present invention.

In order to make objectives, technical solutions, and advantages of the embodiments of the present invention clearer, the technical solutions in embodiments of the present application will be described clearly and completely below. It is apparent that the described embodiments are a part of, rather than all, embodiments of the present invention. Based on the embodiments of the present invention, all other embodiments derived by those of ordinary skill in the art without any creative efforts fall within the protection scope of the present invention.

An diopter-adjustable eyepiece optical system and a head-mounted display device are constructed in the present invention, including a first lens group, a second lens group, and a third lens group which are sequentially arranged from a human eye observation side to a micro image display in an optical axis direction; an effective focal length of the first lens group is set to $f_1$, wherein $f_1$ is a positive value; an effective focal length of the second lens group is set to $f_2$, wherein $f_2$ is a negative value; and an optical surface, close to the side of the micro image display, in the third lens group protrudes towards a direction of the micro image display.

The first lens group is fixed relative to human eyes. When the focal length of the optical system is increased, the second lens group and the third lens group move towards a direction of the human eyes along the optical axis. A distance between the first lens group and the second lens group is reduced, a distance between the third lens group and the micro image display is increased, and a distance between the second lens group and the third lens group is reduced.

The effective focal length of the third lens group is set to $f_3$; the effective focal length of the optical system is set to $f_w$, and $f_1$, $f_2$, $f_3$, and $f_w$ satisfy the following relations (1), (2), and (3):

$$0.32 \leq f_1/f_w \leq 0.61 \qquad (1);$$

$$-3.38 \leq f_2/f_w \leq -0.47 \qquad (2); \text{ and}$$

$$2.84 \leq |f_3/f_w| \qquad (3).$$

A value of $f_1/f_w$ may be 0.32, 0.35, 0.38, 0.41, 0.47, 0.50, 0.53, 0.61, and the like; $f_2/f_w$ may be −3.38, −3.1, −2.95, −2.13, −1.88, −1.55, −1.05, −0.51, −0.47, and the like; and $|f_3/f_w|$ may be 2.84, 3.3, 5.7, 7.1, 8.3, 8.7, 8.8, 9.2, and the like.

In the above embodiment, a diopter-adjustable eyepiece optical system is provided, the first lens group and the second lens group in positive-negative combination is used, and the third lens group is arranged on the second lens group away from the human eye side. When the focal length of the optical system is increased, the second lens group being the negative lens group and the third lens group whose effective focal length is greater than the total focal length of the optical system move towards the human eye side, the distance between the first lens group and the second lens group is reduced, the distance between the third lens group and the micro image display is increased, and the distance between the second lens group and the third lens group is reduced. By means of optical zooming, users having different diopters can focus at fixed points according to usage situations of specific users.

More importantly, on the basis of the above features, the third lens group adjacent to the second lens group is arranged on the first lens group and the second lens group in the positive-negative combination, that is, the problem of image offset in the zooming process is avoided under the action of the third lens group, such that images having large field of view, high definition, no distortion, and no image offset are presented for the users, the consistency of images watched by different users is further ensured, the range of the users is greatly expanded, and the user experience is improved.

Value ranges for $f_1/f_w$, $f_2/f_w$, and $|f_3/f_w|$ in the above relations (1), (2), and (3) are closely related to correction of a system aberration, the difficulty in optical element processing, and the sensitivity of an optical element assembly deviation. The value of $f_1/f_w$ in the relation (1) is greater than 0.32, which allows sufficient correction of the system aberration, thereby achieving a better optical effect, and the value is less than 0.61, thereby improving the machinability of optical elements in the system. The value of $f_2/f_w$ in the relation (2) is greater than −3.38, which improves the machinability of the optical elements in the system, and the value is less than −0.47, which allows full correction of the system aberration, thereby achieving a better optical effect. The value of $|f_3/f_w|$ in the relation (3) is greater than 2.84, which improves the machinability of the optical elements in the system.

In a further embodiment, the effective focal length of the first lens group is $f_1$, the effective focal length of the second lens group is $f_2$, and $f_1$ and $f_2$ satisfy the following relation (4):

$$-0.18 \leq f_1/f_2 \leq -0.70 \tag{4}$$

A value of $f_1/f_2$ may be −0.18, −0.25, −0.33, −0.41, −0.47, −0.55, −0.53, −0.67, −0.7, and the like.

By further optimizing the value ranges of effective focal lengths of the first lens group and the second lens group, the optical performance and manufacturing difficulty of the optical system are better balanced.

In a further embodiment, the first lens group includes a first lens and a second lens, and the first lens is a biconvex positive lens; the effective focal length of the first lens is set to $f_{11}$, the effective focal length of the first lens group is $f_1$, and $f_{11}$ and $f_1$ satisfy the following relation (7):

$$0.468 \leq f_{11}/f_1 \tag{7}$$

A value of $f_{11}/f_1$ may be 0.468, 0.57, 1.75, 2.1, 3.3, 5.7, 8.8, 9.2, and the like.

The value of the above relation (7) is greater than 0.468, for reducing the difficulty in manufacturing the third lens and requirements for high refractive index of the materials.

In a further embodiment, the distance between an optical surface, close to the human eye side, in the first lens group and the micro image display in the optical axis direction of the system is set to $D_w$, the effective focal length of the optical system is set to $f_w$, and $D_w$ and $f_w$ satisfy the following relation (5):

$$1.02 \leq f_w/D_w \leq 1.54 \tag{5}$$

A value of $f_w/D_w$ may be 1.02, 1.13, 1.25, 1.29, 1.33, 1.43, 1.47, 1.51, 1.54, and the like.

A lower limit value of $f_w/D_w$ in the above relation (5) is greater than 1.02, which reduces the difficulty in correcting the off-axis aberration in the system, ensures that a center field of view and an edge field of view simultaneously achieve high image quality, so that the image quality is uniform throughout the entire frame, and the value thereof is less than 1.54, which is conducive to reducing the total length of the system and promoting product miniaturization.

In a further embodiment, the distance between the first lens group and the second lens group in the optical axis direction of the system is set to $D_{12}$; the distance between the second lens group and the third lens group in the optical axis direction of the system is set to $D_{23}$; wherein in a 0-diopter correction state of the eyepiece optical system, the distance between the first lens group and the second lens group in the optical axis direction of the system is set to $D_{120}$, and the distance between the second lens group and the third lens group in the optical axis direction of the system is set to $D_{230}$; and in an X-diopter correction state of the eyepiece optical system, the distance between the first lens group and the second lens group in the optical axis direction of the system is set to $D_{12X}$, and the distance between the second lens group and the third lens group in the optical axis direction of the system is set to $D_{23X}$, and $D_{120}$, $D_{230}$, $D_{12X}$, and $D_{23X}$ satisfy the following relation (6):

$$0.78 \leq (D_{23X} \times D_{230})/(D_{12X} \times D_{120}) \leq 2.74 \tag{6}$$

$(D_{23X}-D_{230})/(D_{12X}-D_{120})$ may be 0.78, 0.83, 1.75, 1.79, 2.30, 2.45, 2.60, 2.74, and the like.

In the above embodiment, the diopter of the eyepiece system is adjusted by adjusting $D_{12}$ and $D_{23}$ in the eyepiece optical system, while $D_w$ remains unchanged, and the second lens group and the third lens group move in the same direction along the optical axis of the system.

In a further embodiment, the first lens group includes a first lens; and the first lens is a biconvex positive lens.

In a further embodiment, the material of the second lens is optical resin; and material properties of the second lens satisfy the following relation (8):

$$V_{d1} \leq 31 \tag{8}$$

wherein the $V_{d1}$ is an Abbe number of the second lens on a line d.

Therefore, the aberrations at various levels of the eyepiece optical system are fully corrected, and the manufacturing cost of optical elements and the weight of the optical system are further controlled.

In a further embodiment, the curvature radius of the optical surface, close to the human eye side, in the first lens is set to $R_{110}$, the curvature radius of the optical surface, close to the side of the micro image display, in the first lens is set to $R_{111}$, and $R_{110}$ and $R_{111}$ satisfy the following relation (9):

$$0.1 \leq |R_{110}/R_{111}| \leq 1.83 \qquad (9).$$

$|R_{110}/R_{111}|$ may be 0.1, 0.15, 0.35, 0.45, 0.55, 0.72, 1.32, 1.45, 1.65, 1.83, and the like.

A lower limit value condition of $|R_{110}/R_{111}|$ in the relation (9) is greater than 0.1, allowing the first lens to provide sufficient positive focal power, which can better balance and correct the system aberration and achieve a good optical effect, and the value thereof is less than 1.83, thereby reducing the difficulty in spherical aberration correction and facilitating the realization of a large optical aperture.

In a further embodiment, the second lens group includes a third lens; and the third lens is a negative lens.

In a further embodiment, the third lens group includes a fourth lens; the curvature radius of an optical surface, far from the side of the micro image display, in the fourth lens is set to $R_{130}$, and the curvature radius of an optical surface, close to the side of the micro image display, in the fourth lens is set to $R_{131}$, and $R_{130}$ and $R_{131}$ satisfy the following relation (10):

$$0.71 \leq R_{130}/R_{131} \leq 0.80 \qquad (10).$$

$R_{130}/R_{131}$ may be 0.71, 0.73, 0.75, 0.767, 0.789, 0.798, 0.80, and the like.

This not only optimizes the aberrations at all levels of the optical system, but also ensures the good manufacturability of the second lens.

In a further embodiment, material properties of the fourth lens satisfy the following relations (11) and (12):

$$N_{d3} \geq 1.80 \qquad (11); \text{ and}$$

$$V_{d3} \leq 41 \qquad (12);$$

wherein the $N_{d3}$ is the refractive index of the fourth lens on the line d; and the $V_{d3}$ is an Abbe number of the fourth lens on the line d.

In a further embodiment, the first lens group and the second lens group include one or more even-order aspherical face shapes; and the even-order aspherical face shape satisfies the following relation (13):

$$z = \frac{cr^2}{1+\sqrt{1-(1+k)c^2r^2}} + \alpha_2 r^2 + \alpha_4 r^4 + \alpha_6 r^6 + \ldots, \qquad (13)$$

wherein z is the vector height of the optical surface, c is the curvature at an aspheric vertex, and k is an aspheric coefficient, $\alpha 2, 4, 6 \ldots$ are coefficients of various orders, and r is a distance coordinate from a point on a curved face to an optical axis of a lens system.

The aberrations (including spherical aberration, coma, distortion, field curvature, astigmatism, chromatic aberration and other higher-order aberrations) of the optical system are fully corrected, which is beneficial for the eyepiece optical system to further improve the image quality of the central field-of-view and the edge field-of-view, reduce the image quality difference between the central field-of-view and the edge field-of-view and thus to achieve more uniform image quality and low distortion in the full frame while realizing a large angle of view and a large aperture.

The principles, solutions and display results of the above-mentioned eyepiece optical system will be further described below through more specific examples.

In the following examples, as shown in FIG. 1, including a first lens group T1, a second lens group T2, and a third lens group T3 which are sequentially arranged from a human eye observation side to the micro image display in the optical axis direction. A diaphragm EYE may be the exit pupil of imaging for the eyepiece optical system, which is a virtual light exit aperture. When the pupil of the human eye is at the diaphragm position, the best imaging effect can be observed. An optical surface close to the diaphragm EYE side is numbered 1, and so on (2, 3, 4, 5, 6, 7, and 8 from left to right). The micro image display is an IMG, and light emitted from the micro image display passes through the third lens group T3, the second lens group T2, and the first lens group T1 sequentially before entering the human eye.

EXAMPLE 1

The eyepiece design data of Example 1 is shown in Table 1 and 2 below:

TABLE 1

| Surface | Curvature radius (mm) | Thickness (mm) | Lens Refractive index | Abbe number | Net caliber (mm) | Cone coefficient |
|---|---|---|---|---|---|---|
| Diaphragm | Infinite | 16.21303 | | | 8 | |
| 2 | 27.48351 | 8.769675 | 1.7433 | 49.335808 | 26.15708 | −2.132477 |
| 3 | −37.63384 | 0.4075846 | | | 26.17454 | 3.236596 |
| 4 | −57.95492 | 2.018046 | 1.6421 | 22.406984 | 25.83167 | 4.659293 |
| 5 | −30.23251 | A | | | 25.7421 | 2.693406 |
| 6 | −26.03293 | 2.546972 | 1.6319 | 23.416119 | 24.65904 | −11.49305 |
| 7 | 55.77196 | B | | | 22.62648 | 6.697327 |
| 8 | −14.07554 | 8.00548 | 1.92286 | 18.895456 | 23.2579 | |
| 9 | −19.57804 | C | | | 31.92095 | |
| 10 | Infinite | 0.7 | | | 44.07778 | |
| Image face | Infinite | | | | 44.15212 | |

TABLE 2

| | Myopia 700° | Myopia 600° | Myopia 500° | Myopia 400° | Myopia 300° | Myopia 200° | Myopia 100° | Hyperopia 200° |
|---|---|---|---|---|---|---|---|---|
| A | 0.497 | 0.785 | 1.07 | 1.36 | 1.64 | 1.92 | 2.22 | 2.36 |
| B | 9.95 | 10.99 | 11.91 | 12.87 | 13.83 | 14.79 | 15.82 | 16.31 |
| C | 9.97 | 8.65 | 7.45 | 6.19 | 4.94 | 3.71 | 2.38 | 1.75 |

FIG. 1 is a 2D diagram of a 700-degree myopia optical structure according to Example 1, including the first lens group T1, the second lens group T2, and the third lens group T3 which are sequentially arranged from the human eye EYE observation side to the micro image display IMG in the optical axis direction. The first lens group is a positive lens group, and the second lens group is a negative lens group. The first lens group T1 is fixed relative to the human eye EYE. When the focal length of the optical system is increased, the second lens group T2 and the third lens group T3 of the negative lens group move towards the human eye EYE side, as shown in FIG. 1 and Table 1 and Table 2. From C to B to A, the distance between the first lens group T1 and the second lens group T2 is reduced, the distance between the third lens group T3 and the micro image display IMG is increased, and the distance between the second lens group T2 and the third lens group T3 is reduced. The first lens group T1 in the optical system is composed of a first lens T11 of a biconvex positive lens and a second lens T12 of a meniscus lens. The second lens group T2 is composed of a third lens T21 of a biconcave lens, and the material of the second lens is OKP1. The third lens group T3 is composed of a fourth lens T31 of a meniscus lens. The maximum focal length $f_{w(MAX)}$ of the optical system is 59.6, the minimum focal length $f_{w(MIN)}$ is 47.3, $D_w$ is 42.87, the focal length $f_1$ of the first lens group T1 is 19.24, the focal length $f_2$ of the second lens group T2 is −27.56, and the focal length $f_3$ of the third lens group T3 is −433.02. Therefore, the relations of $f_w$, $f_1$, $f_2$, and $f_3$ are that $f_1/f_{w(MAX)}$ is 0.323, $f_1/f_{w(MIN)}$ is 0.407, $f_2/f_{w(MAX)}$ is −0.4624, $f_2/f_{w(MIN)}$ ) is −0.58, $f_3/f_{w(MAX)}$ −7.265, $f_3/f_{w(MIN)}$ is −9.15, $f_w/D_{w(MAX)}$ is 1.39, $f_w/D_{w(MIN)}$ is 1.1, and $f_1/f_2$ is −0.698. The distance $D_{12}$ and the distance $D_{23}$ are $D_{120}$ and $D_{230}$ respectively in a correction state of the eyepiece optical system, and are $D_{12X}$ and $D_{23X}$ respectively in an X-diopter correction state of the eyepiece optical system. The maximum value of $(D_{23X}-D_{230})/(D_{12X}-D_{120})$ is 0.297 and the minimum value is 0.285. The curvature radius $R_{130}$ of an optical surface of the fourth lens T31, far from of the micro image display IMG, in the third lens group T3 is −14.08, and the curvature radius $R_{131}$ of an optical surface close to the micro image display IMG is −19.578, and $R_{130}/R_{131}$ is 0.72. The curvature radius $R_{110}$ of an optical surface the first lens T11, far from of the micro image display IMG, in the first lens group T1 is 27.48, the curvature radius $R_{111}$ of the optical surface close to the micro image display IMG is −37.63, and $|R_{110}/R_{111}|$ is 0.73.

Figure 5:
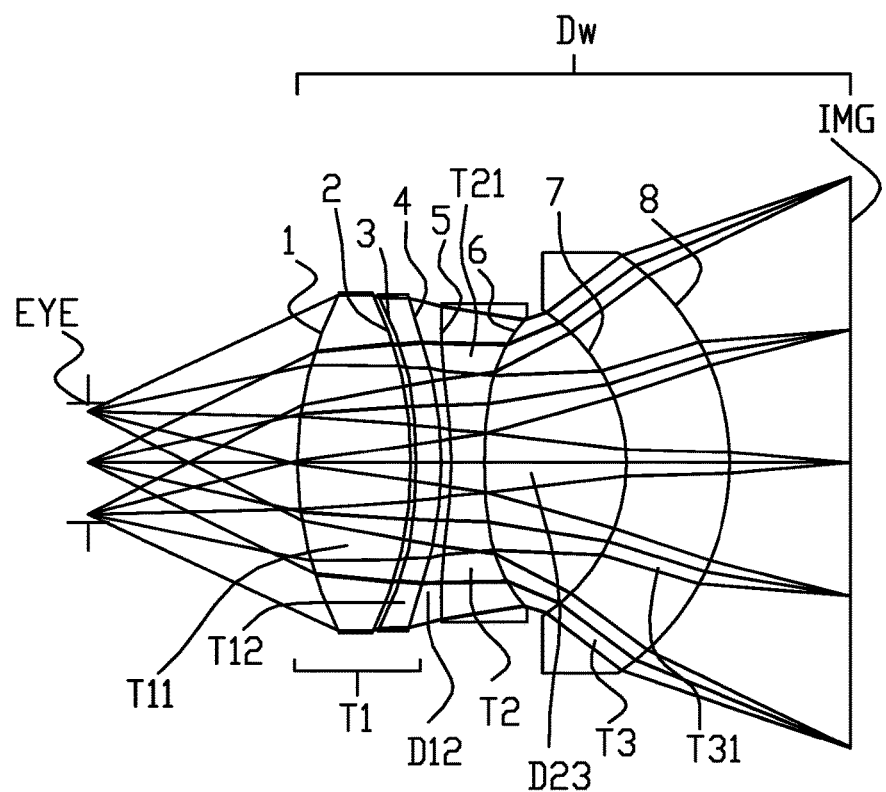
FIG. 5 is an optical path diagram of a 300-degree myopia eyepiece optical system according to Example 1 of the present invention.
Figure 6:
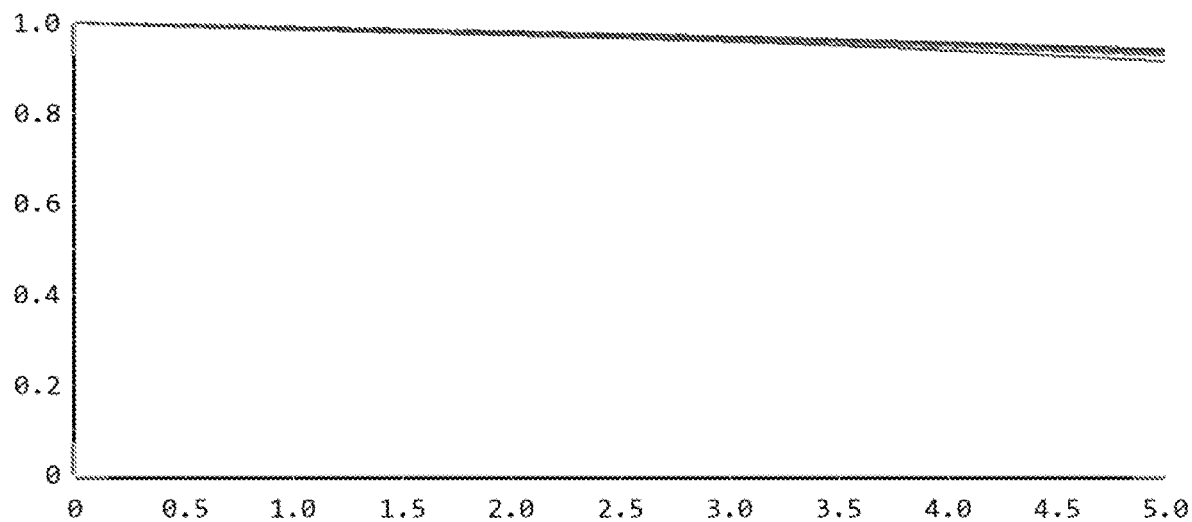
FIG. 6 is a plot of the MTF of the 300-degree myopia eyepiece optical system according to Example 1 of the present invention.
Figure 7:
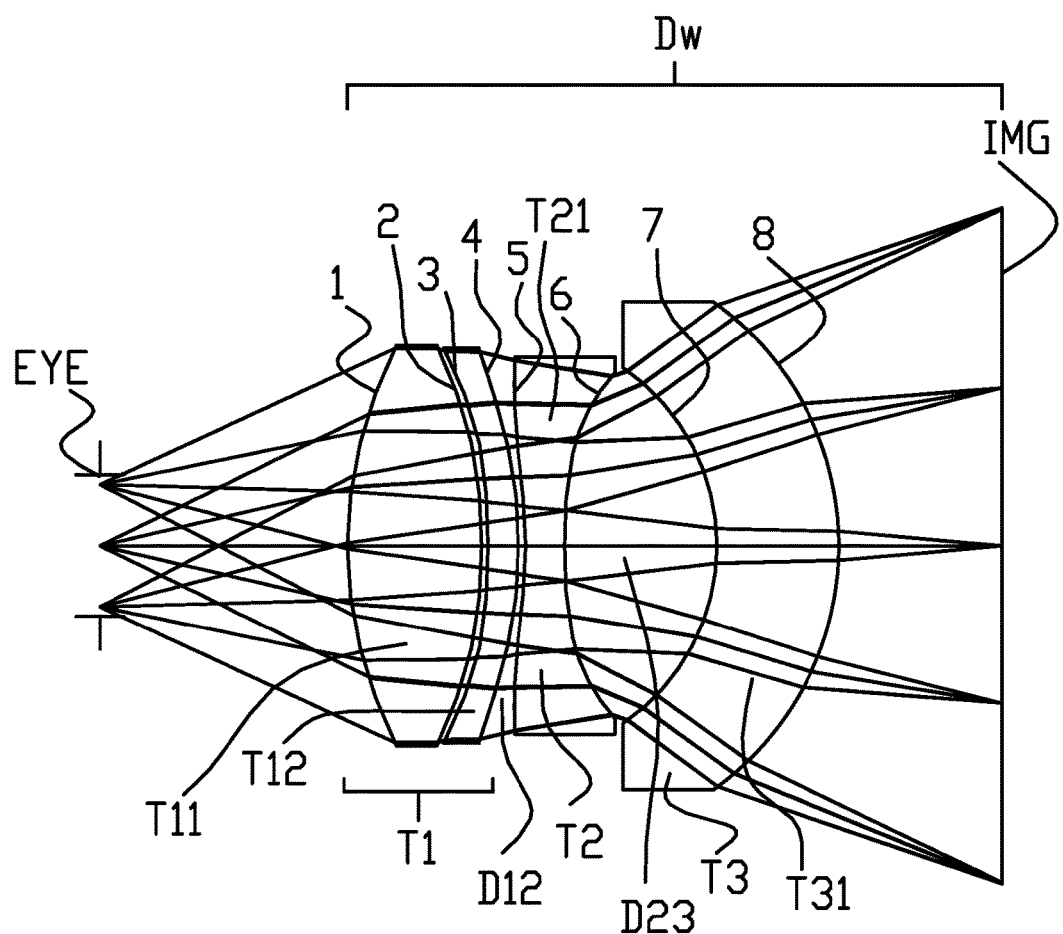
FIG. 7 is an optical path diagram of a 0-diopter eyepiece optical system according to Example 1 of the present invention.
Figure 8:
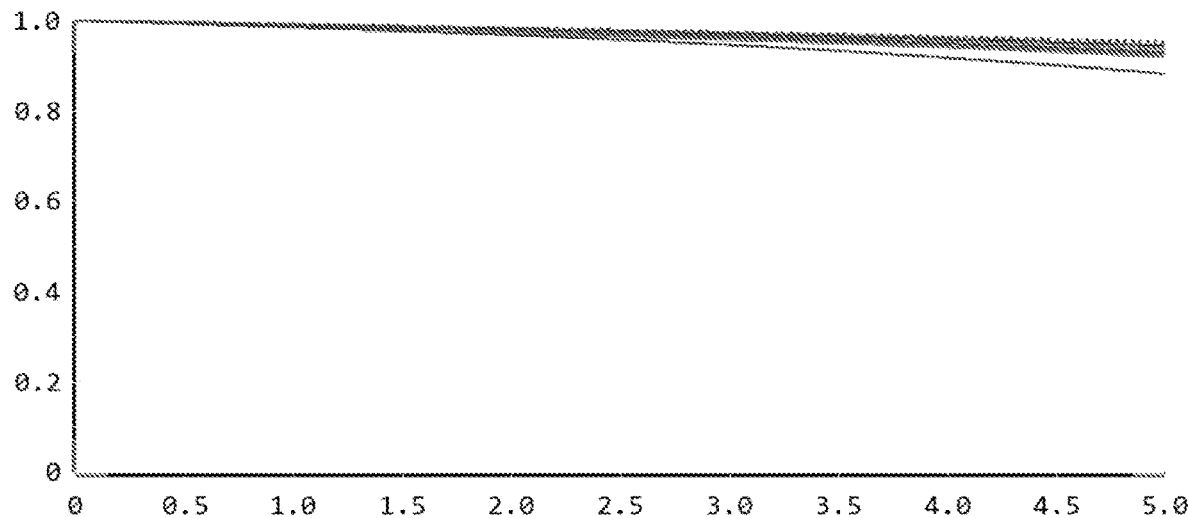
FIG. 8 is a plot of the MTF of the 0-diopter eyepiece optical system according to Example 1 of the present invention.

FIG. 2, FIG. 3A, FIG. 3B, and FIG. 4 are respectively a spot array diagram, a plot of the transfer function MTF, a plot of the field, and a plot of the distortion of the optical system at myopia of 700 degrees, FIG. 5 and FIG. 6 are an optical structure diagram and a plot of the transfer function MTF at myopia of 300 degrees, and FIG. 7 and FIG. 8 are an optical structure diagram and a plot of the transfer function MTF at a 0-diopter, which reflect that respective field-of-view light in this example has high resolution and very small optical distortion in the unit pixel of the image plane (micro image display IMG), the resolution per 10 mm per unit period reaches more than 0.8, the aberration of the optical system and the image drift are well corrected, and a display image of uniformity and high optical performance can be observed through the eyepiece optical system.

EXAMPLE 2

The eyepiece design data of Example 2 is shown in Table 3 and Table 4:

TABLE 3

| | Lens | | | | | |
|---|---|---|---|---|---|---|
| Surface | Curvature radius (mm) | Thickness (mm) | Refractive index | Abbe number | Net caliber (mm) | Cone coefficient |
| Diaphragm | Infinite | 16.78342 | | | 8 | |
| 2 | 42.64666 | 7.341449 | 1.6779 | 54.896588 | 25.89847 | −8.516225 |
| 3 | −23.37249 | A | | | 26.29532 | −0.6537036 |
| 6 | −6.169389 | 3.677161 | 1.6319 | 23.416119 | 24.94111 | −1.983281 |
| 7 | −9.81586 | B | | | 25.26074 | −2.202623 |
| 8 | −17.23022 | 6.215859 | 1.945958 | 17.943914 | 26.16997 | |
| 9 | −21.61323 | C | | | 32.44374 | |
| 10 | Infinite | 0.7 | | | 44.0252 | |
| Image face | Infinite | | | | 44.09504 | |

TABLE 4

|   | Myopia 700° | Myopia 600° | Myopia 500° | Myopia 400° | Myopia 300° | Myopia 200° | Myopia 100° | Hyperopia 200° |
|---|---|---|---|---|---|---|---|---|
| A | 0.497 | 0.785 | 1.07 | 1.36 | 1.64 | 1.92 | 2.22 | 10.50 |
| B | 9.95 | 10.99 | 11.91 | 12.87 | 13.83 | 14.79 | 15.82 | 13.03 |
| C | 9.97 | 8.65 | 7.45 | 6.19 | 4.94 | 3.71 | 2.38 | 1.78 |

Figure 9:
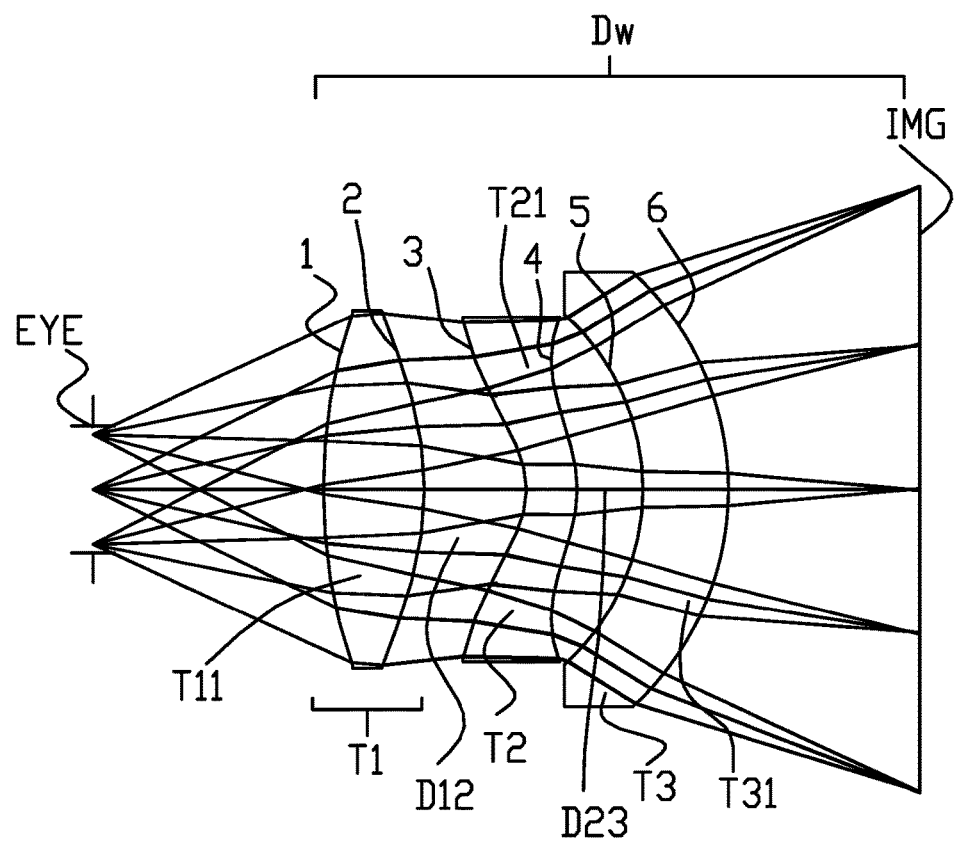
FIG. 9 is an optical path diagram of a 700-degree myopia eyepiece optical system according to Example 2 of the present invention.
Figure 12:
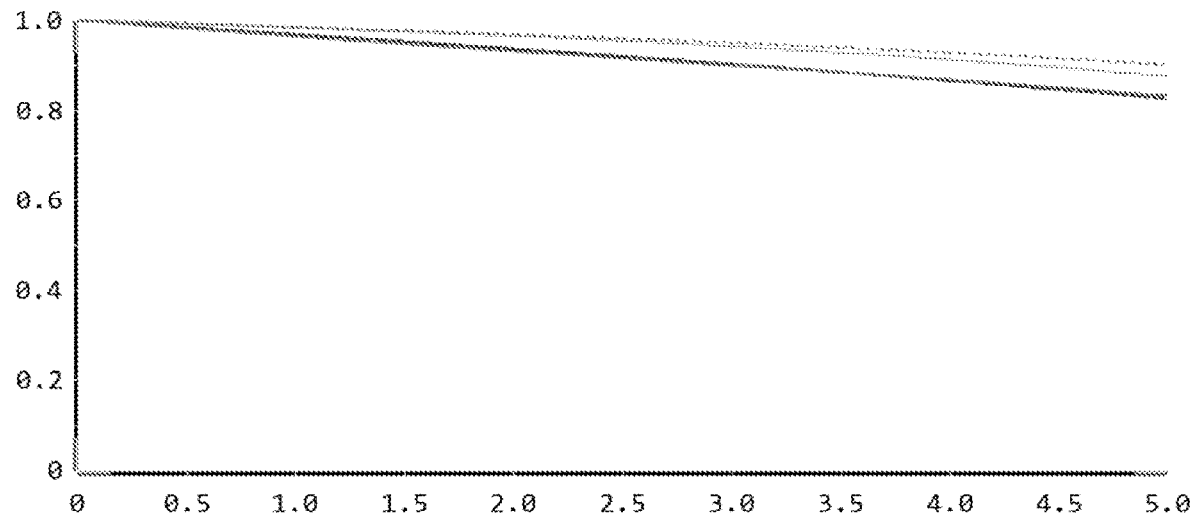
FIG. 12 is a plot of the MTF of the 700-degree myopia eyepiece optical system according to Example 2 of the present invention.

FIG. 9 is a 2D diagram of a 700-degree myopia optical structure according to Example 1, including the first lens group T1, the second lens group T2, and the third lens group T3 which are sequentially arranged from the human eye EYE side to the micro image display IMG in the optical axis direction. The first lens group T1 is the positive lens group, and the second lens group T2 is a negative lens group. The first lens group T1 is fixed relative to the human eye EYE. When the focal length of the optical system is increased, the second lens group T2 and the third lens group T3 being the negative lens groups move towards the human eye EYE side, as shown in FIG. 9 and Table 3 and Table 4. From C to B to A, the distance between the first lens group T1 and the second lens group T2 is reduced, the distance between the third lens group T3 and the micro image display IMG is increased, and the distance between the second lens group T2 and the third lens group T3 is reduced. The first lens group T1 in the optical system is composed of a first lens T11 of a biconvex positive lens. The second lens group T2 is composed of a second lens T21 of a meniscus lens, and the material thereof is OKP4HT. The third lens group T3 is composed of a third lens T31 of a meniscus lens. The maximum focal length $f_{w(MAX)}$ of the optical system is 57.14, the minimum focal length $f_{w(MIN)}$ is 46.7, $D_w$ is 43.46, the focal length $f_1$ of the first lens group T1 is 23.26, the focal length $f_2$ of the second lens group T2 is $-42.95$, and the focal length $f_3$ of the third lens group T3 is $-289.52$. Therefore, the relations of $f_w$, $f_1$, $f_2$, and $f_3$ are that $f_1/f_{w(MAX)}$ is 0.407, $f_1/f_{w(MIN)}$ is 0.498, $f_2/f_{w(MAX)}$ is $-0.752$, $f_1/f_{w(MIN)}$ is $-0.92$, $f_3/f_{w(MAX)}$ $-5.067$, $f_3/f_{w(MIN)}$ is $-6.2$, $f_w/D_{w(MAX)}$ is 1.31, $f_w/D_{w(MIN)}$ is 1.07, and $f_1/f_2$ is $-0.542$. The distance $D_{12}$ and the distance $D_{23}$ are $D_{120}$ and $D_{230}$ respectively in a 0-diopter correction state of the eyepiece optical system, and are $D_{12X}$ and $D_{23X}$ respectively in an X-diopter correction state of the eyepiece optical system. The maximum value of $(D_{23X}-D_{230})/(D_{12X}-D_{120})$ is 0.463 and the minimum value is 0.325. The curvature radius $R_{130}$ of an optical surface of the third lens T31, far from of the micro image display IMG, in the third lens group T3 is $-17.23$, and the curvature radius $R_{131}$ of an optical surface close to the micro image display IMG is $-21.61$, and $R_{130}/R_{131}$ is 0.797. The curvature radius Rim of an optical surface the first lens T11, far from of the micro image display IMG, in the first lens group T1 is 42.65, the curvature radius $R_{111}$ of the optical surface close to of the micro image display IMG is $-23.37$, and $|R_{110}/R_{111}|$ is 1.82.

Figure 13:
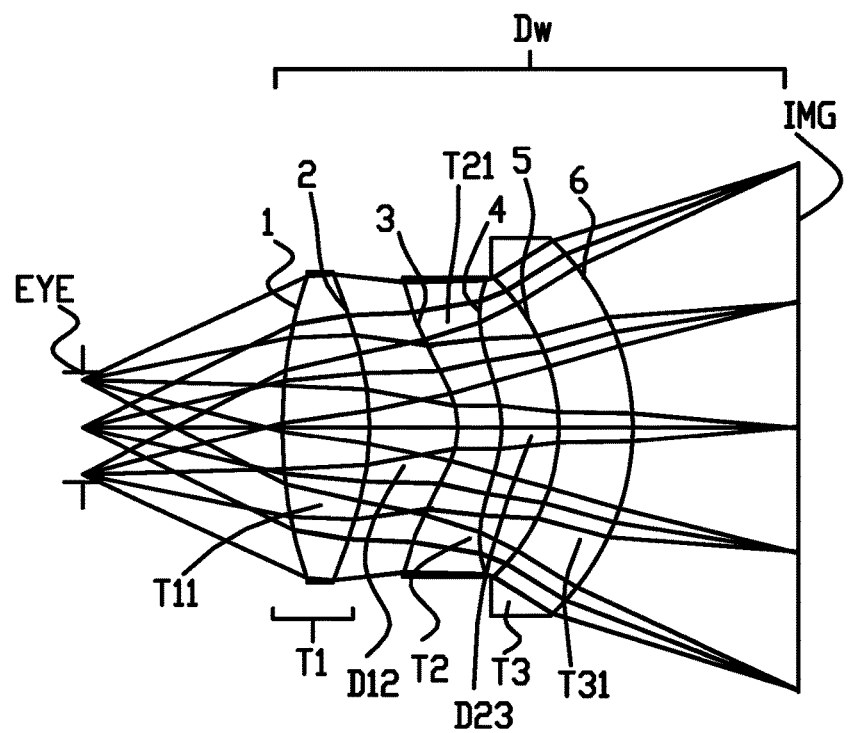
FIG. 13 is an optical path diagram of a 300-degree myopia eyepiece optical system according to Example 2 of the present invention.
Figure 14:
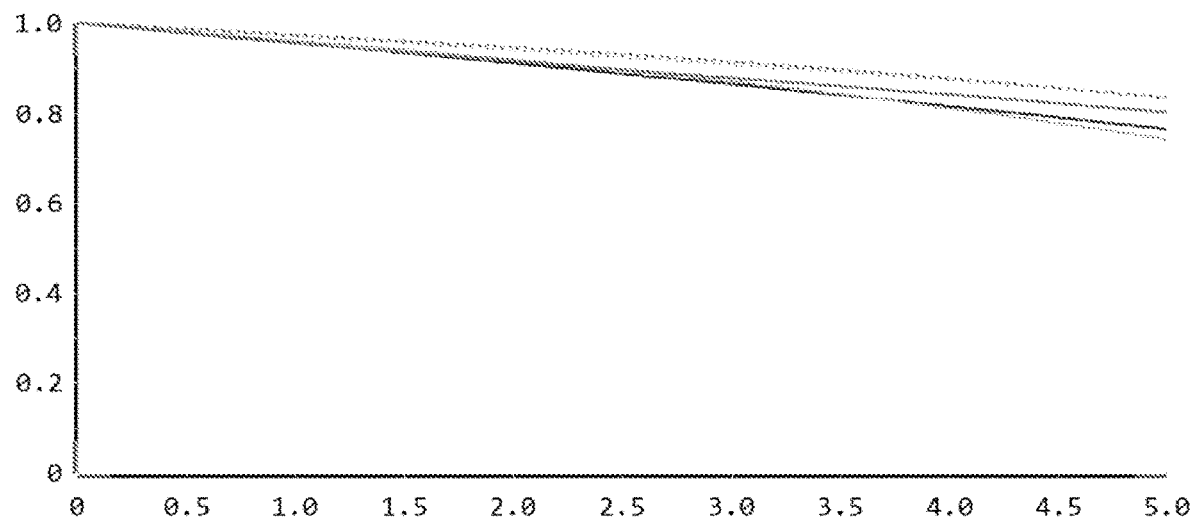
FIG. 14 is a plot of the MTF of the 300-degree myopia eyepiece optical system according to Example 2 of the present invention.
Figure 15:
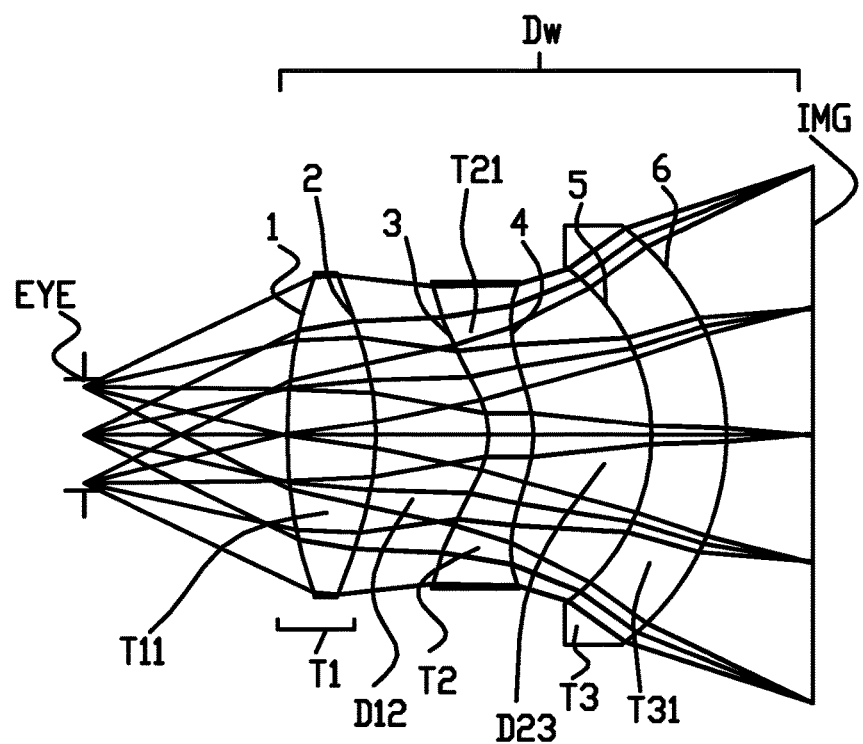
FIG. 15 is an optical path diagram of a 0-diopter eyepiece optical system according to Example 2 of the present invention.
Figure 16:
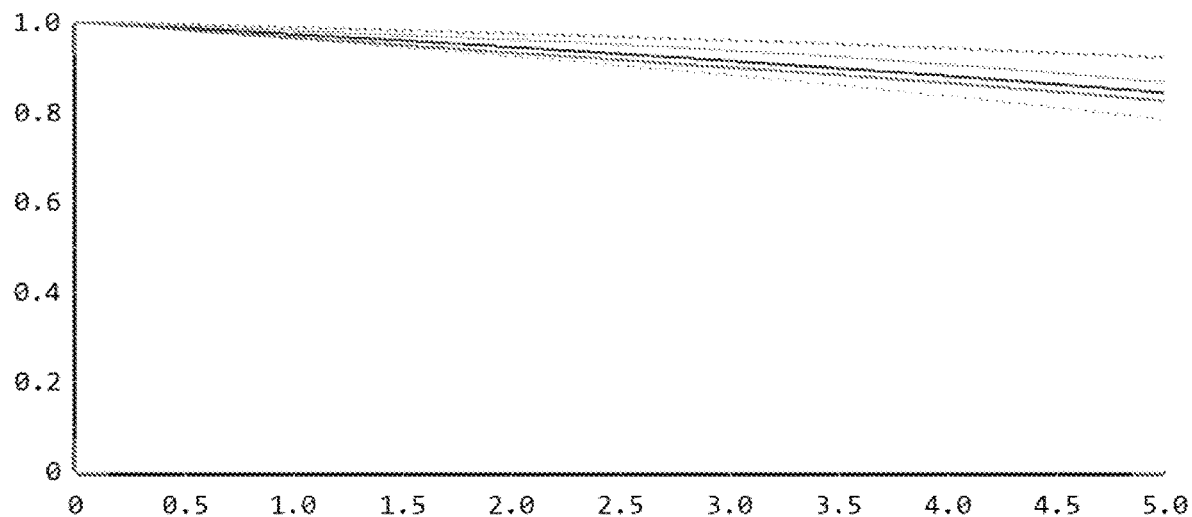
FIG. 16 is a plot of the MTF of the 0-diopter eyepiece optical system according to Example 2 of the present invention.

FIG. 10, FIG. 11A, FIG. 11B, and FIG. 12 are respectively a spot array diagram, a plot of the transfer function MTF, a plot of the field, and a plot of the distortion of the optical system at myopia of 700 degrees, FIG. 13 and FIG. 14 are an optical structure diagram and a plot of the transfer function MTF at myopia of 300 degrees, and FIG. 15 and FIG. 16 are an optical structure diagram and a plot of the transfer function MTF at a 0-diopter, which reflect that respective field-of-view light in this example has high resolution and very small optical distortion in the unit pixel of the image plane (micro image display IMG), the resolution per 5 mm per unit period reaches more than 0.7, the aberration of the optical system and the image drift are well corrected, and a display image of uniformity and high optical performance can be observed through the eyepiece optical system.

EXAMPLE 3

The eyepiece design data of Example 3 is shown in Table 5 and Table 6:

TABLE 5

| Surface | Curvature radius (mm) | Thickness (mm) | Lens Refractive index | Abbe number | Net caliber (mm) | Cone coefficient |
|---|---|---|---|---|---|---|
| Diaphragm | Infinite | 16.71263 | | | 8 | |
| 2 | 31.75185 | 8.258051 | 1.69384 | 53.151009 | 21.77359 | $-0.5720127$ |
| 3 | $-28.37313$ | 0.1898844 | | | 22.22953 | $-0.1766544$ |
| 4 | 179.3952 | 1.421303 | 1.64219 | 22.406984 | 21.17595 | 20.91595 |
| 5 | 48.34787 | A | | | 20.45855 | 3.213858 |
| 6 | $-73.04613$ | 1.831305 | 1.60317 | 28.308517 | 20.36946 | 1.324482 |
| 7 | 50.97706 | B | | | 20.49999 | 10.43562 |
| 8 | $-15.51976$ | 6.604473 | 1.92286 | 18.895456 | 23.35084 | |
| 9 | $-19.452$ | C | | | 29.39596 | |
| 10 | Infinite | 0.7 | | | 32.98818 | |
| Image face | Infinite | | | | 32.9592 | |

TABLE 6

| | Myopia 700° | Myopia 600° | Myopia 500° | Myopia 400° | Myopia 300° | Myopia 200° | Myopia 100° | Hyperopia 200° |
|---|---|---|---|---|---|---|---|---|
| A | 3.3 | 4.017 | 5.079 | 5.85 | 7.13 | 7.744 | 8.706 | 9.2 |
| B | 8.73 | 9.76 | 9.64 | 10.86 | 10.99 | 12.22 | 12.99 | 13.24 |
| C | 11.73 | 9.99 | 9.05 | 7.05 | 5.65 | 3.8 | 2.07 | 1.33 |

Figure 17:
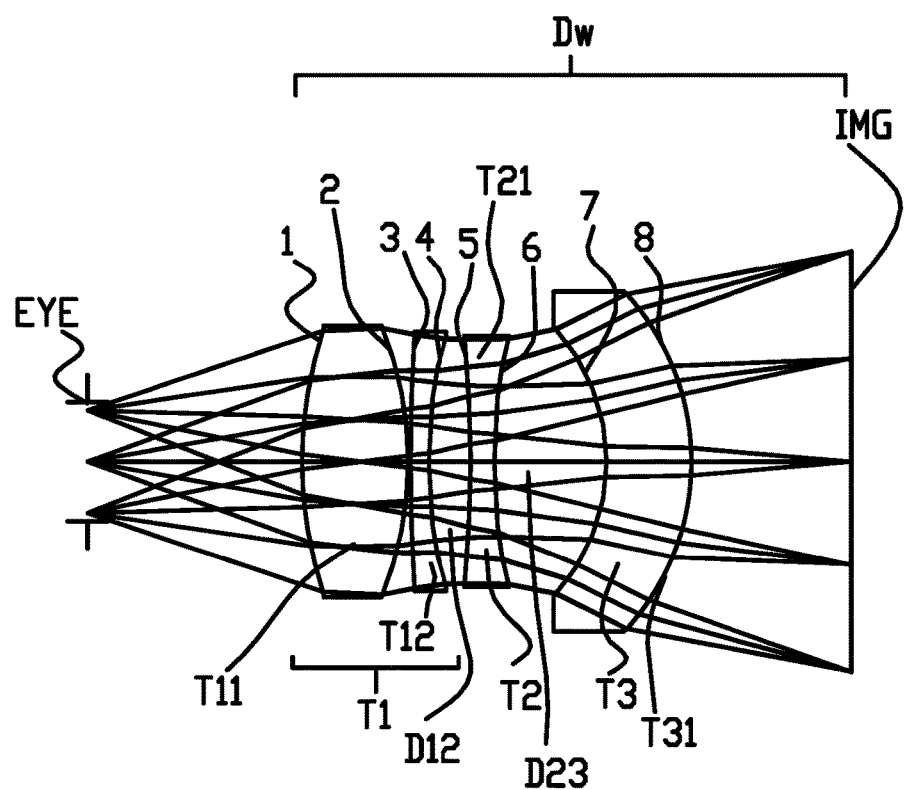
FIG. 17 is an optical path diagram of a 700-degree myopia eyepiece optical system according to Example 3 of the present invention.
Figure 18:
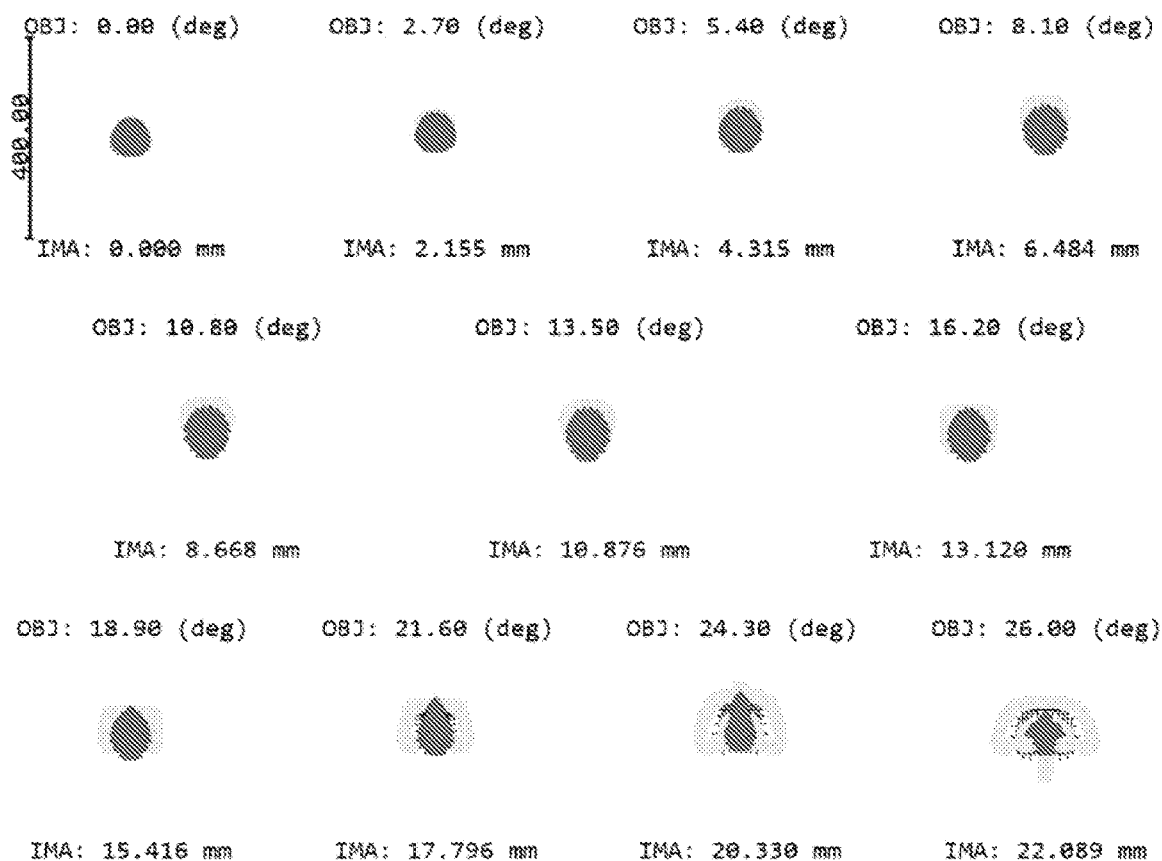
FIG. 18 is a spot array diagram of the eyepiece optical system according to Example 3 of the present invention.
Figure 19A:
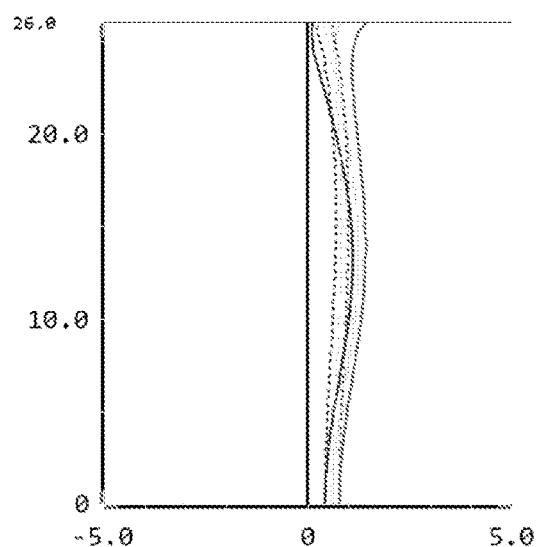
FIG. 19A is a plot of the field of the eyepiece optical system according to Example 3 of the present invention.
Figure 19B:
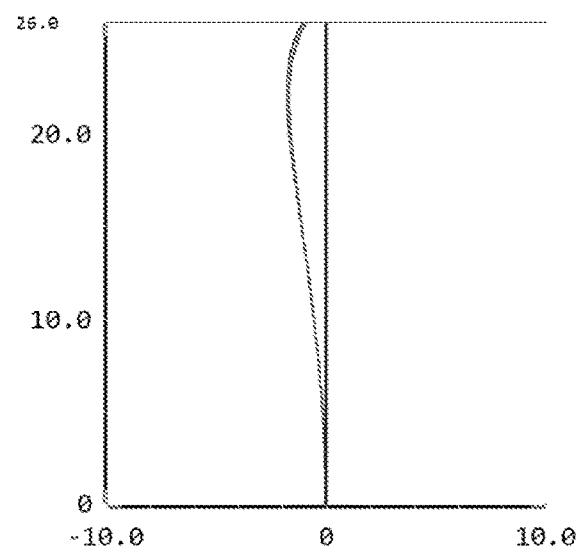
FIG. 19B is a plot of the distortion of the eyepiece optical system according to Example 3 of the present invention.
Figure 20:
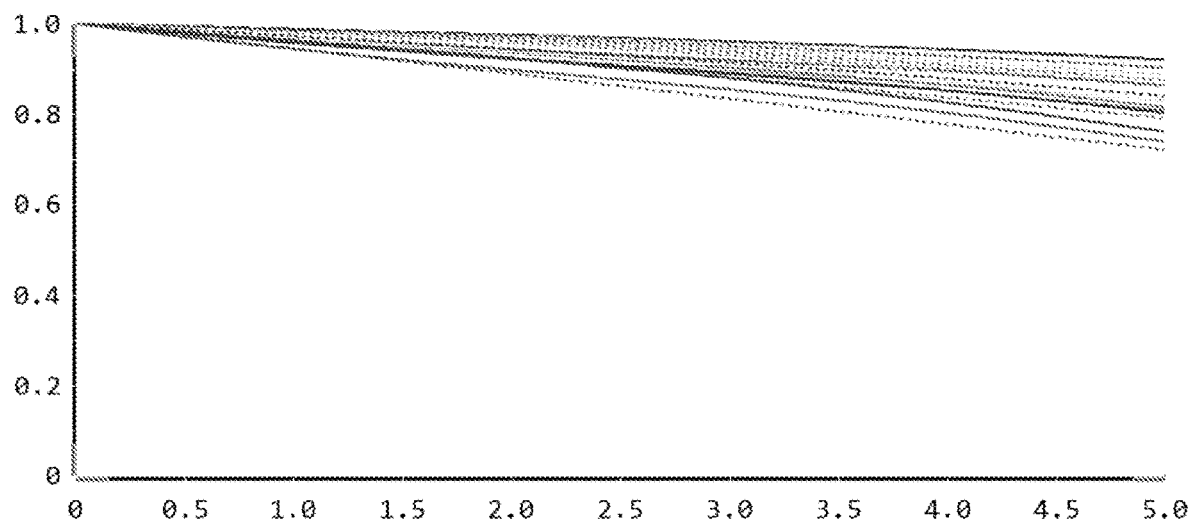
FIG. 20 is a plot of the MTF of the 700-degree myopia eyepiece optical system according to Example 3 of the present invention.

FIG. 17 is a 2D diagram of an optical structure of a zooming process according to Example 3, including the first lens group T1, the second lens group T2, and the third lens group T3 which are sequentially arranged from the human eye EYE side to the micro image display IMG in the optical axis direction. The first lens group T1 is the positive lens group, and the second lens group T2 is a negative lens group. The first lens group T1 is fixed relative to the human eye EYE. When the focal length of the optical system is increased, the second lens group T2 and the third lens group T3 being the negative lens groups move towards the human eye EYE side, as shown in FIG. 17 and Table 5 and Table 6. From C to B to A, the distance between the first lens group T1 and the second lens group T2 is reduced, the distance between the third lens group T3 and the micro image display IMG is increased, and the distance between the second lens group T2 and the third lens group T3 is reduced. The first lens group T1 in the optical system is composed of a first lens T11 of a biconvex positive lens and a second lens T12 of a meniscus negative lens. The second lens group T2 is composed of a third lens T21 of a biconcave negative lens, and the material thereof is EP4000. The third lens group is composed of a fourth lens T31 of a meniscus lens. The maximum focal length $f_{w(MAX)}$ of the optical system is 59.6, the minimum focal length $f_{w(MIN)}$ is 47.3, $D_w$ is 42.81, the focal length $f_1$ of the first lens group T1 is 27.99, the focal length $f_2$ of the second lens group T2 is −49.24, and the focal length $f_3$ of the third lens group T3 is −433. Therefore, the relations of $f_w$, $f_1$, $f_2$, and $f_3$ are that $f_1/f_{w(MAX)}$ is 0.47, $f_1/f_{w(MIN)}$ is 0.59, $f_2/f_{w(MAX)}$ is −0.826, $f_2/f_{w(MIN)}$ is −1.04, $f_3/f_{w(MAX)}$ −7.27, $f_3/f_{w(MIN)}$ is −9.15, $f_w/D_{w(MAX)}$ is 1.39, $f_w/D_{w(MIN)}$ is 1.1, and $f_1/f_2$ is −0.568. The distance $D_{12}$ and the distance $D_{23}$ are $D_{120}$ and $D_{230}$ respectively in a 0-diopter correction state of the eyepiece optical system, and are $D_{12X}$ and $D_{23X}$ respectively in an X-diopter correction state of the eyepiece optical system. The maximum value of $(D_{23X}-D_{230})/(D_{12X}-D_{120})$ is 1.976 and the minimum value is 0.788. The curvature radius $R_{130}$ of an optical surface of the lens T31, far from of the micro image display IMG, in the third lens group T3 is -15.52, and the curvature radius $R_{131}$ of an optical surface close to the micro image display IMG is −19.45, and $R_{130}/R_{131}$ is 0.798. The curvature radius Rico of an optical surface the first lens T11, far from of the micro image display IMG, in the first lens group T1 is 31.75, the curvature radius $R_{111}$ of the optical surface close to the micro image display IMG is −28.37, and $|R_{110}/R_{111}|$ is 1.12.

Figure 21:
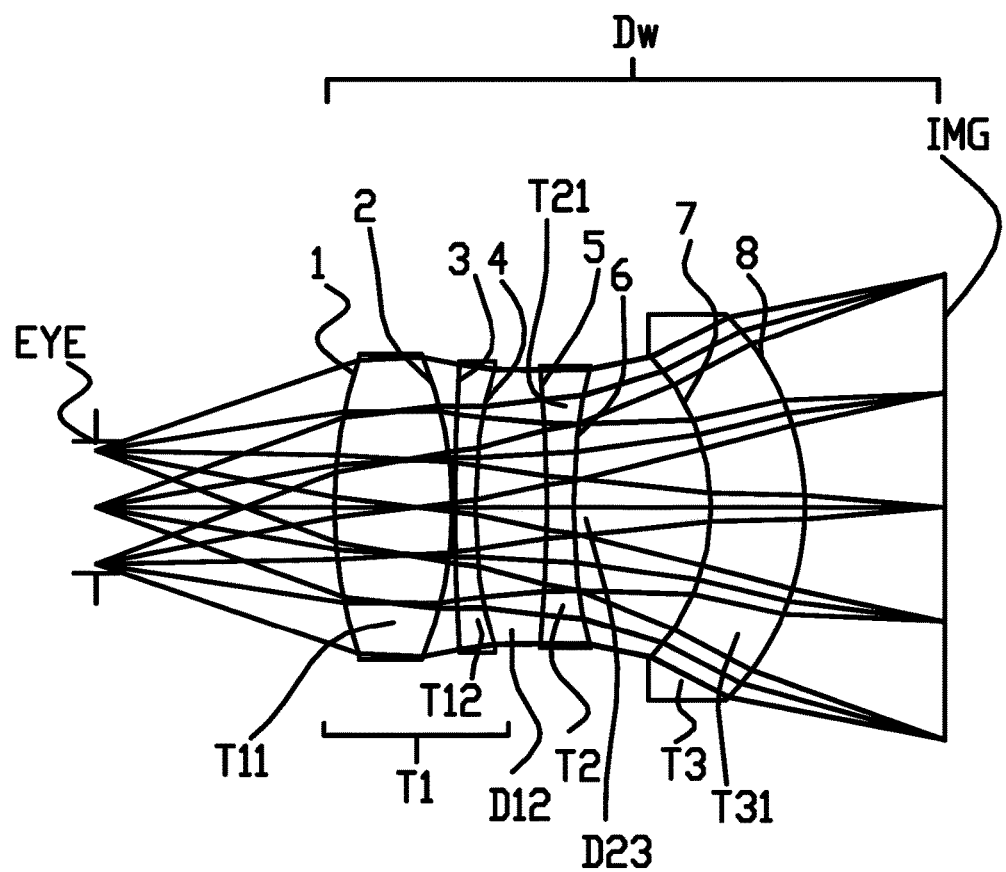
FIG. 21 is an optical path diagram of a 300-degree myopia eyepiece optical system according to Example 3 of the present invention.
Figure 22:
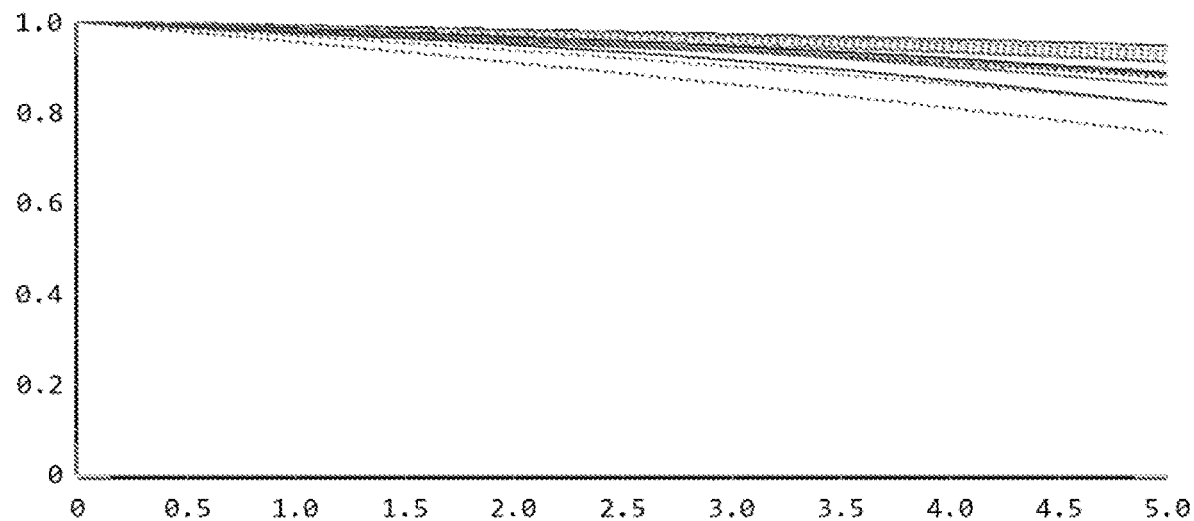
FIG. 22 is a plot of the MTF of the 300-degree myopia eyepiece optical system according to Example 3 of the present invention.
Figure 23:
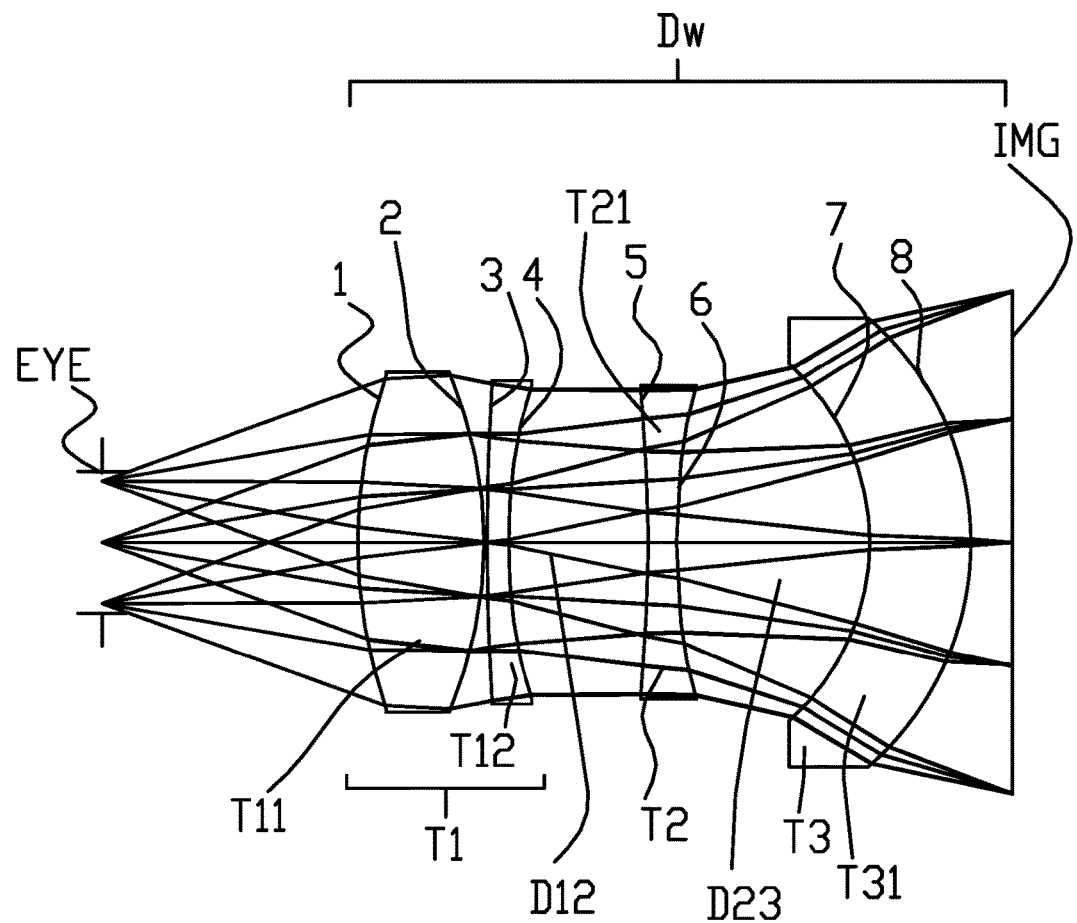
FIG. 23 is an optical path diagram of a 0-diopter eyepiece optical system according to Example 3 of the present invention.
Figure 24:
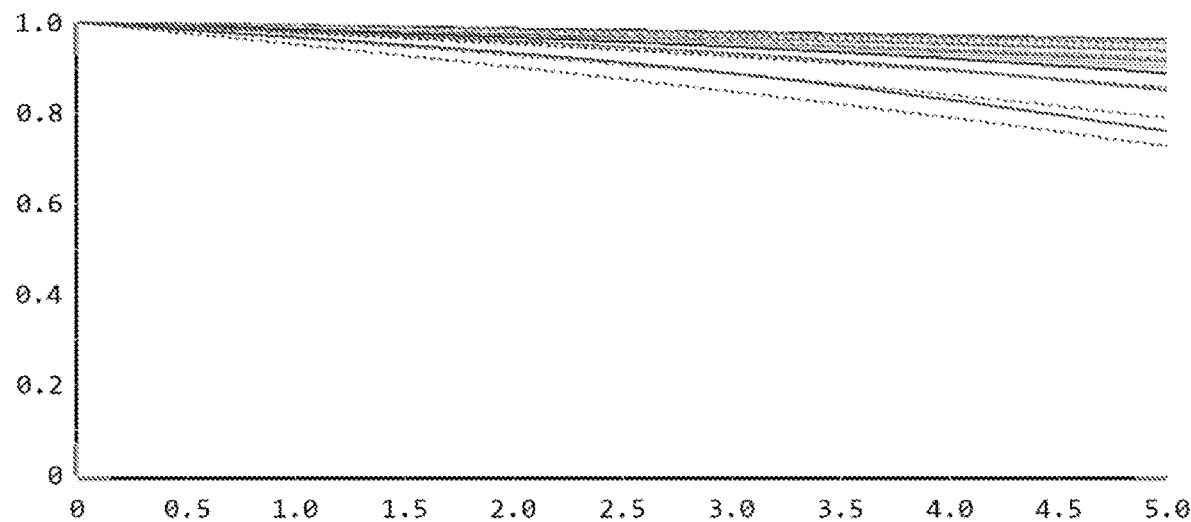
FIG. 24 is a plot of the MTF of the 0-diopter eyepiece optical system according to Example 3 of the present invention.

FIG. 18, FIG. 19A, FIG. 19B, and FIG. 20 are respectively a spot array diagram, a plot of the transfer function MTF, a plot of the field, and a plot of the distortion of the optical system at myopia of 700 degrees, FIG. 21 and FIG. 22 are an optical structure diagram and a plot of the transfer function MTF at myopia of 300 degrees, and FIG. 23 and FIG. 24 are an optical structure diagram and a plot of the transfer function MTF at a 0-diopter, which reflect that respective field-of-view light in this example has high resolution and very small optical distortion in the unit pixel of the image plane (micro image display IMG), the resolution per 5 mm per unit period reaches more than 0.7, the aberration of the optical system and the image drift are well corrected, and a display image of uniformity and high optical performance can be observed through the eyepiece optical system.

EXAMPLE 4

The eyepiece design data of Example 4 is shown in Table 7 and Table 8:

TABLE 7

| Surface | Curvature radius (mm) | Thickness (mm) | Refractive index | Abbe number | Net caliber (mm) | Cone coefficient |
|---|---|---|---|---|---|---|
| Diaphragm | Infinite | 18.9023 | | | 5 | |
| 2 | 28.09626 | 7.268131 | 1.693631 | 49.233011 | 20.82769 | −27.08188 |
| 3 | −11.95059 | 0.1873558 | | | 20.55882 | −3.504588 |
| 4 | −22.58198 | 1.772798 | 1.7847 | 25.719658 | 19.7871 | 2.849297 |
| 5 | 65.42017 | 9.226776 | | | 19.89392 | −60.00263 |
| 6 | −9.50465 | 4.339918 | 1.66672 | 48.431709 | 20.19262 | −2.179697 |
| 7 | −12.38996 | 12.75118 | | | 21.20915 | −0.5981751 |
| 8 | −12.6761 | 6.70999 | 1.83481 | 42.727483 | 22.52624 | |
| 9 | −16.96047 | 1.789288 | | | 29.32086 | |
| 10 | Infinite | 0.7403686 | | | 32.19988 | |
| Image face | Infinite | | | | 32.01547 | |

TABLE 8

| | Myopia 700° | Myopia 600° | Myopia 500° | Myopia 400° | Myopia 300° | Myopia 200° | Myopia 100° | Hyperopia 200° |
|---|---|---|---|---|---|---|---|---|
| A | 3.3 | 4.23 | 5.079 | 6.05 | 7.13 | 7.83 | 8.71 | 9.23 |
| B | 8.73 | 9.17 | 9.64 | 10.19 | 10.99 | 11.63 | 12.56 | 12.75 |
| C | 11.73 | 10.36 | 9.05 | 7.53 | 5.65 | 4.3 | 2.49 | 1.79 |

Figure 25:
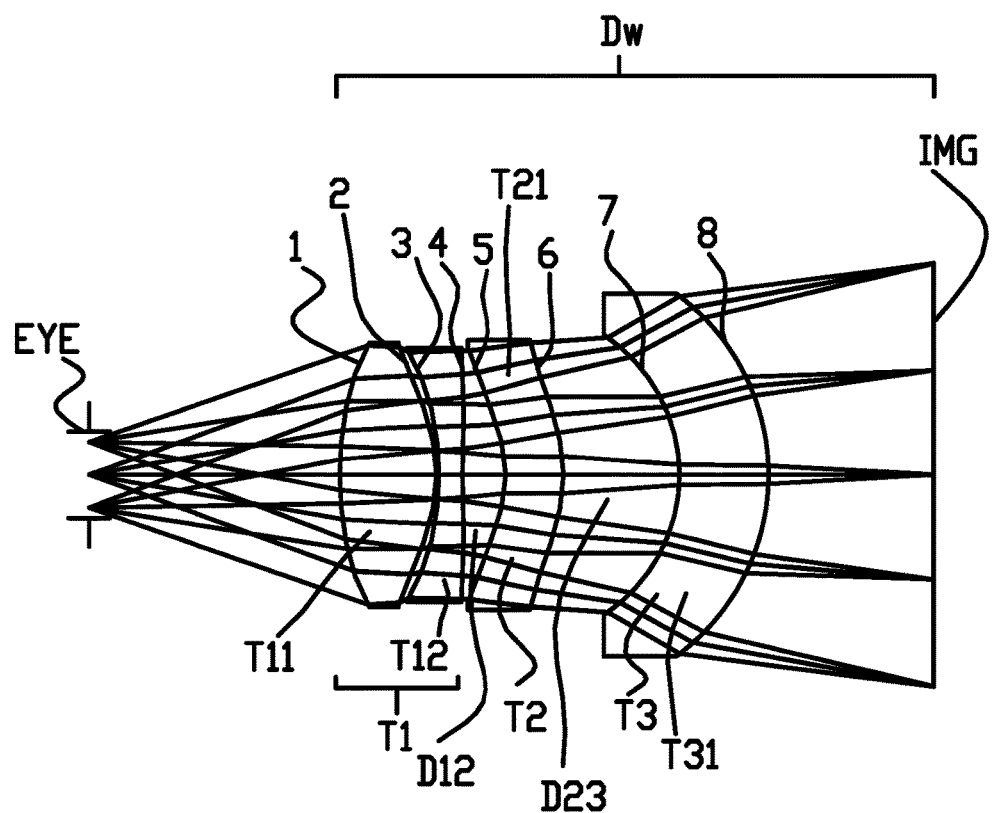
FIG. 25 is an optical path diagram of a 700-degree myopia eyepiece optical system according to Example 4 of the present invention.
Figure 28:
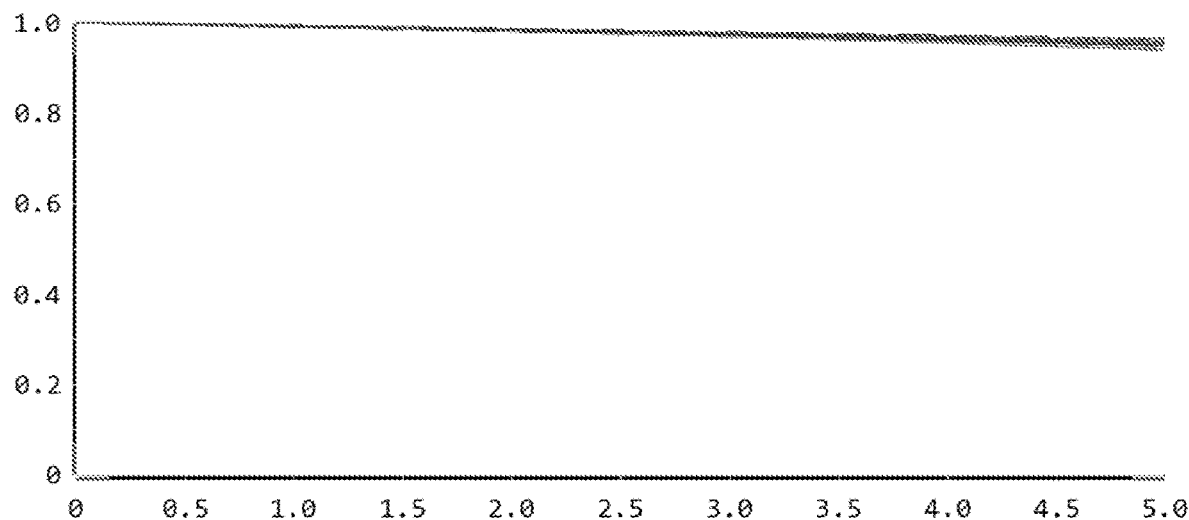
FIG. 28 is a plot of the MTF of the 700-degree myopia eyepiece optical system according to Example 4 of the present invention.

FIG. 25 is a 2D diagram of an optical structure of a zooming process according to Example 4, including the first lens group T1, the second lens group T2, and the third lens group T3 which are sequentially arranged from the human eye EYE side to the micro image display IMG in the optical axis direction. The first lens group T1 is the positive lens group, and the second lens group T2 is a negative lens group. The first lens group T1 is fixed relative to the human eye EYE. When the focal length of the optical system is increased, the second lens group T2 being the negative lens group and the third lens group T3 move towards the human eye EYE side, as shown in FIG. 25 and Table 7 and Table 8. From C to B to A, the distance between the first lens group T1 and the second lens group T2 is reduced, the distance between the third lens group T3 and the micro image display IMG is increased, and the distance between the second lens group T2 and the third lens group T3 is reduced. The first lens group T1 in the optical system is composed of a first lens T11 of a biconvex positive lens and a second lens T12 of a meniscus negative lens. The second lens group T2 is composed of a third lens T21 of a meniscus negative lens, and the material thereof is EP4000. The third lens group T3 is composed of a fourth lens T31 of a meniscus lens. The maximum focal length $f_{w(MAX)}$ of the optical system is 52.46, the minimum focal length $f_{w(MIN)}$ is 45.47, $D_w$ is 44.79, the focal length $f_1$ of the first lens group T1 is 27.77, the focal length $f_{11}$ of the first lens T11 is 13.02, the focal length $f_2$ of the second lens group T2 is −153.65, and the focal length $f_3$ of the third lens group T3 is −209.4. Therefore, the relations of $f_w$, $f_1$, $f_2$, and $f_3$ are that $f_1/f_{w(MAX)}$ is 0.61, $f_1/f_{w(MIN)}$ is 0.53, $f_2/f_{w(MAX)}$ is −3.38, $f_2/f_{w(MIN)}$ is −2.93, $f_3/f_{w(MAX)}$ −4.6, $f_3/f_{w(MIN)}$ is −3.99, $f_w/D_{w(MAX)}$ is 1.02, $f_w/D_{w(MIN)}$ is 1.17, $f_1/f_2$ is −0.18, and $f_{11}/f_1$ is 0.47. The distance $D_{12}$ and the distance $D_{23}$ are $D_{120}$ and $D_{230}$ respectively in a 0-diopter correction state of the eyepiece optical system, and are $D_{12X}$ and $D_{23X}$ respectively in an X-diopter correction state of the eyepiece optical system. The maximum value of $(D_{23X}-D_{230})/(D_{12X}-D_{120})$ is 2.74 and the minimum value is 0.95. The curvature radius $R_{130}$ of an optical surface of the lens T31, far from of the micro image display IMG, in the third lens group T3 is −12.68, and the curvature radius $R_{131}$ of an optical surface close to the micro image display IMG is −16.96, and $R_{130}/R_{131}$ is 0.75. The curvature radius Rico of an optical surface the lens T11, far from of the micro image display IMG, in the first lens group T1 is 28.1, the curvature radius $R_{111}$ of the optical surface close to the micro image display IMG is −11.95, and $|R_{110}/R_{111}|$ is 2.35.

Figure 29:
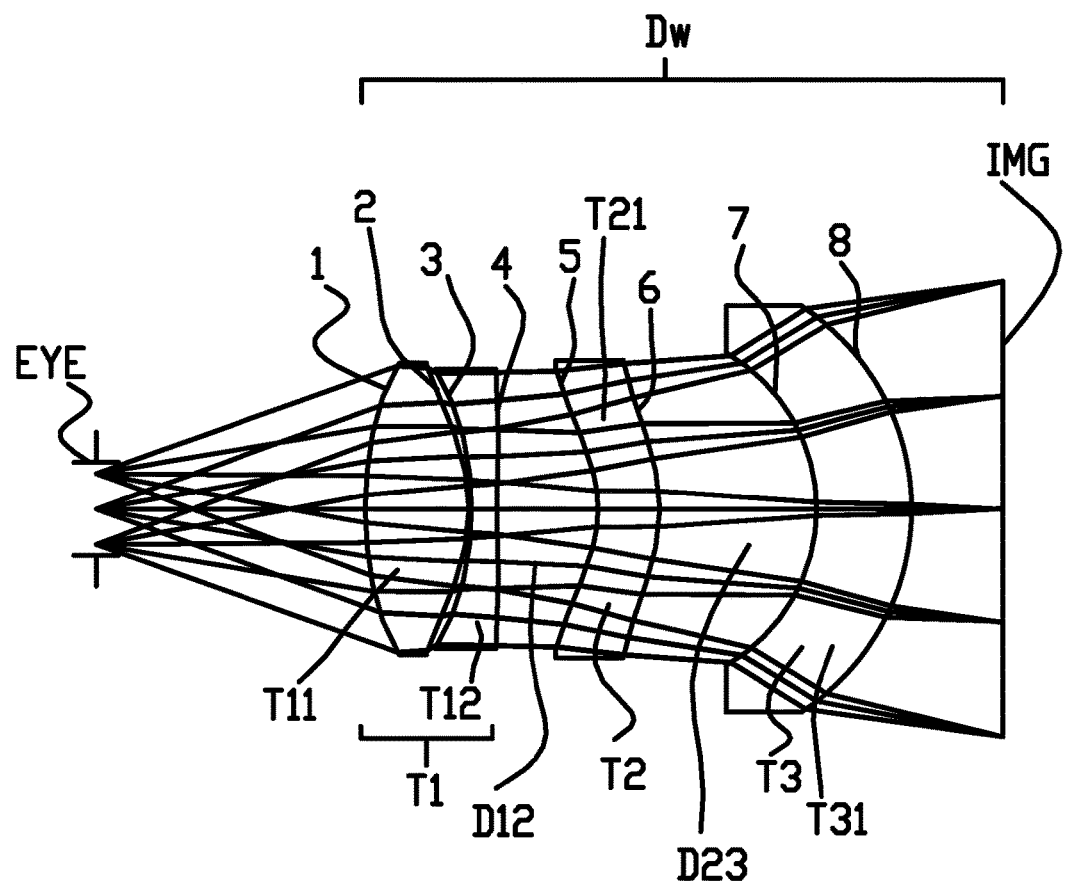
FIG. 29 is an optical path diagram of a 300-degree myopia eyepiece optical system according to Example 4 of the present invention.
Figure 30:
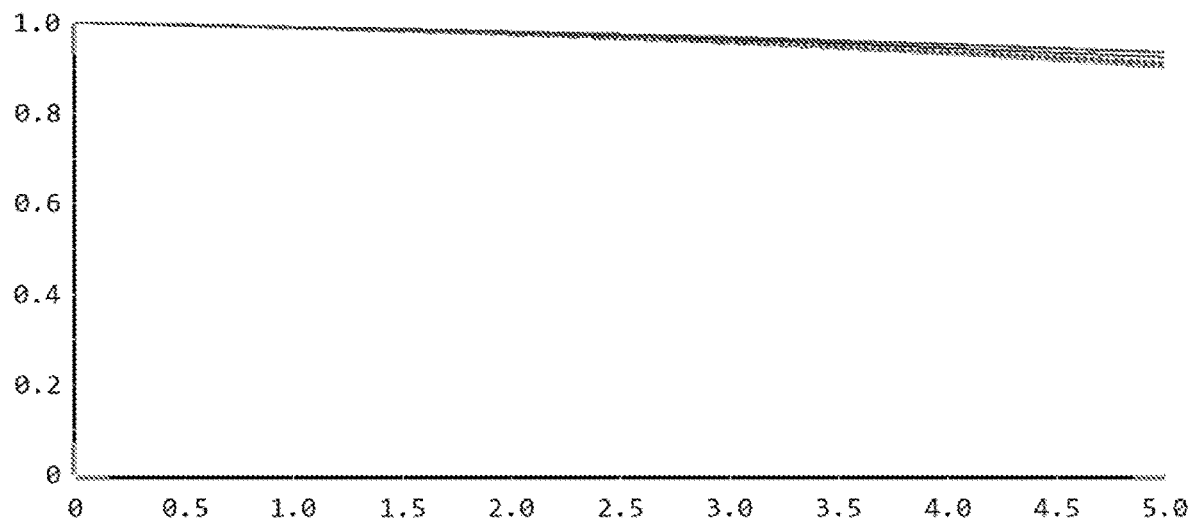
FIG. 30 is a plot of the MTF of the 300-degree myopia eyepiece optical system according to Example 4 of the present invention.
Figure 31:
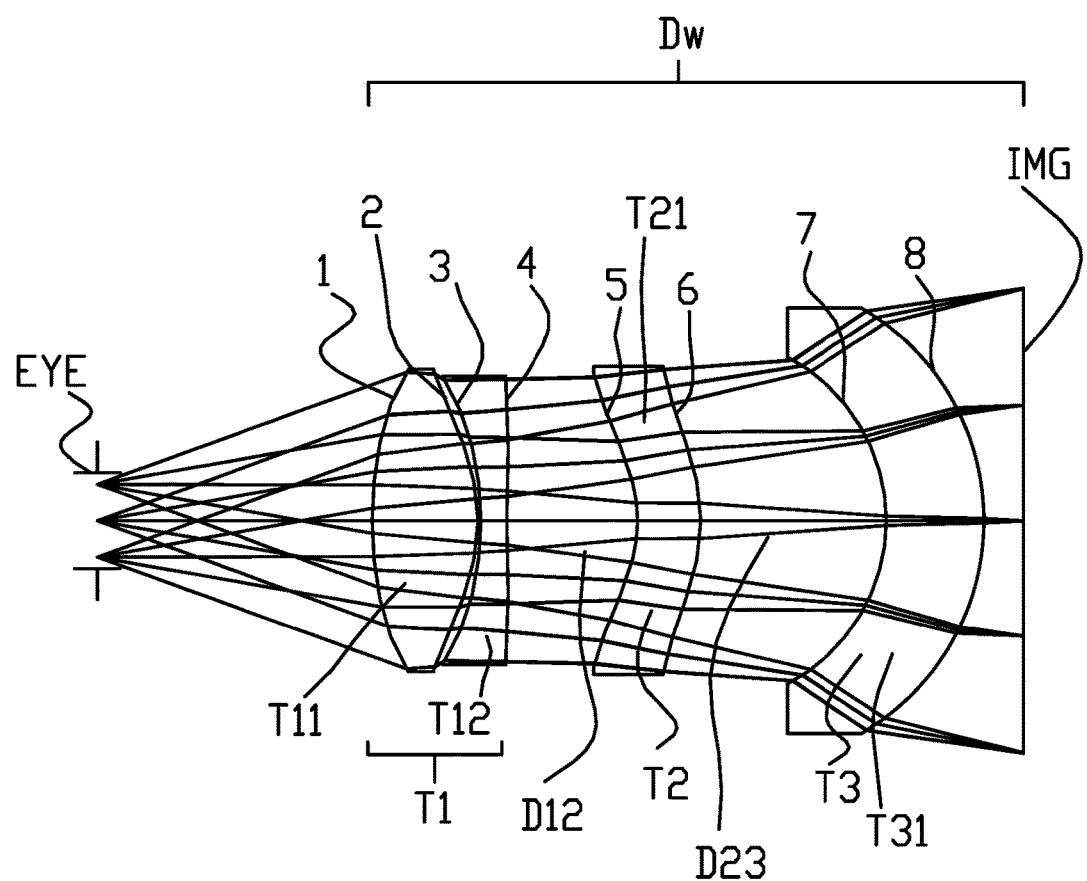
FIG. 31 is an optical path diagram of a 0-diopter eyepiece optical system according to Example 4 of the present invention.
Figure 32:
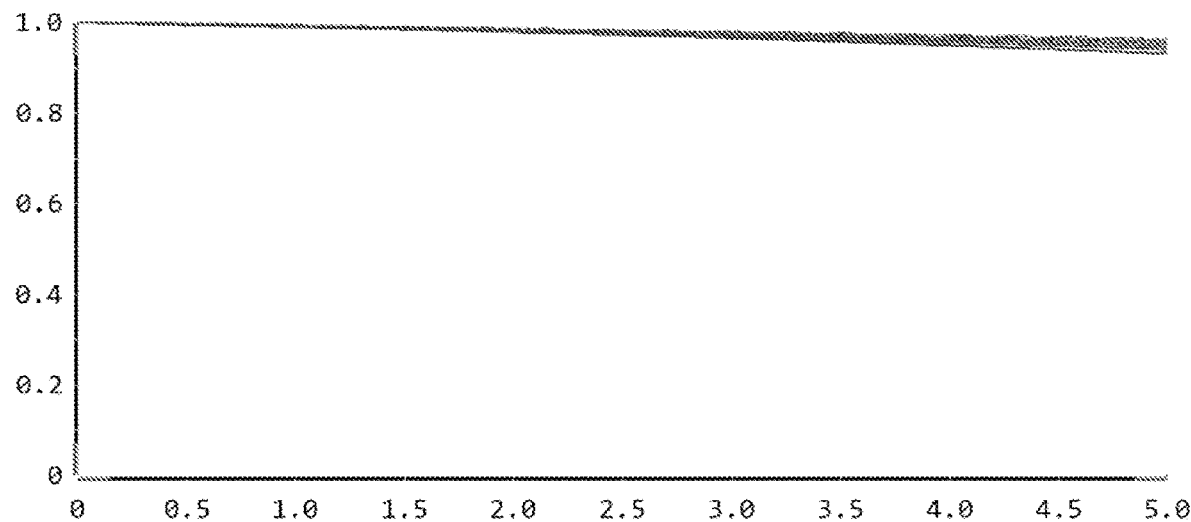
FIG. 32 is a plot of the MTF of the 0-diopter eyepiece optical system according to Example 4 of the present invention.

FIG. 26, FIG. 27A, FIG. 27B, and FIG. 28 are respectively a spot array diagram, a plot of the transfer function MTF, a plot of the field, and a plot of the distortion of the optical system at myopia of 700 degrees, FIG. 29 and FIG. 30 are an optical structure diagram and a plot of the transfer function MTF at myopia of 300 degrees, and FIG. 31 and FIG. 32 are an optical structure diagram and a plot of the transfer function MTF at a 0-diopter, which reflect that respective field-of-view light in this example has high resolution and very small optical distortion in the unit pixel of the image plane (micro image display IMG), the resolution per 5 mm per unit period reaches more than 0.7, the aberration of the optical system and the image drift are well corrected, and a display image of uniformity and high optical performance can be observed through the eyepiece optical system.

EXAMPLE 5

The eyepiece design data of Example 5 is shown in Table 9 and Table 10:

TABLE 9

| Surface | Curvature radius (mm) | Thickness (mm) | Lens Refractive index | Abbe number | Net caliber (mm) | Cone coefficient |
|---|---|---|---|---|---|---|
| Diaphragm | Infinite | 16.05988 | | | 5 | |
| 2 | 39.1844 | 7.204872 | 1.603112 | 60.633158 | 17.80521 | 3.472683 |
| 3 | −371.2984 | 0.1990586 | | | 19.08252 | 59.96636 |
| 4 | 263.9963 | 4.377389 | 1.581438 | 40.895946 | 19.13106 | −60.00116 |
| 5 | −34.52169 | A | | | 19.69101 | 2.492755 |
| 6 | −75.81778 | 9.020109 | 1.922867 | 18.895456 | 20.27162 | 22.44726 |
| 7 | 91.41243 | B | | | 21.18893 | 20.21996 |
| 8 | −13.68025 | 8.99912 | 1.803373 | 45.526021 | 24.21648 | |
| 9 | −19.0671 | C | | | 33.75321 | |
| 10 | Infinite | 0.7403686 | | | 40.59523 | |
| Image face | Infinite | | | | 40.68275 | |

TABLE 10

| | Myopia 700° | Myopia 600° | Myopia 500° | Myopia 400° | Myopia 300° | Myopia 200° | Myopia 100° | Hyperopia 200° |
|---|---|---|---|---|---|---|---|---|
| A | 3.16 | 5.19 | 6.08 | 6.52 | 7.45 | 7.98 | 8.94 | 9.4 |
| B | 8.73 | 9.33 | 9.96 | 10.42 | 11.09 | 11.58 | 12.3 | 12.76 |
| C | 12.26 | 6.25 | 4.74 | 5.28 | 3.68 | 3.98 | 2.29 | 2 |

Figure 33:
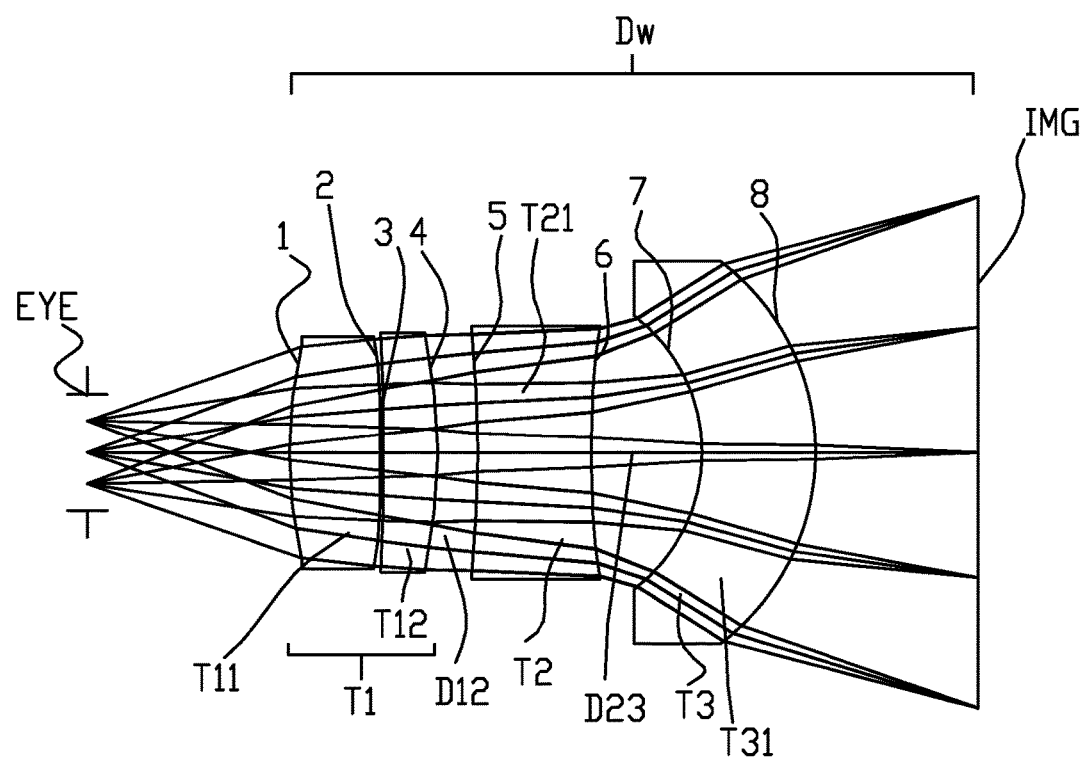
FIG. 33 is an optical path diagram of a 700-degree myopia eyepiece optical system according to Example 5 of the present invention.
Figure 34:
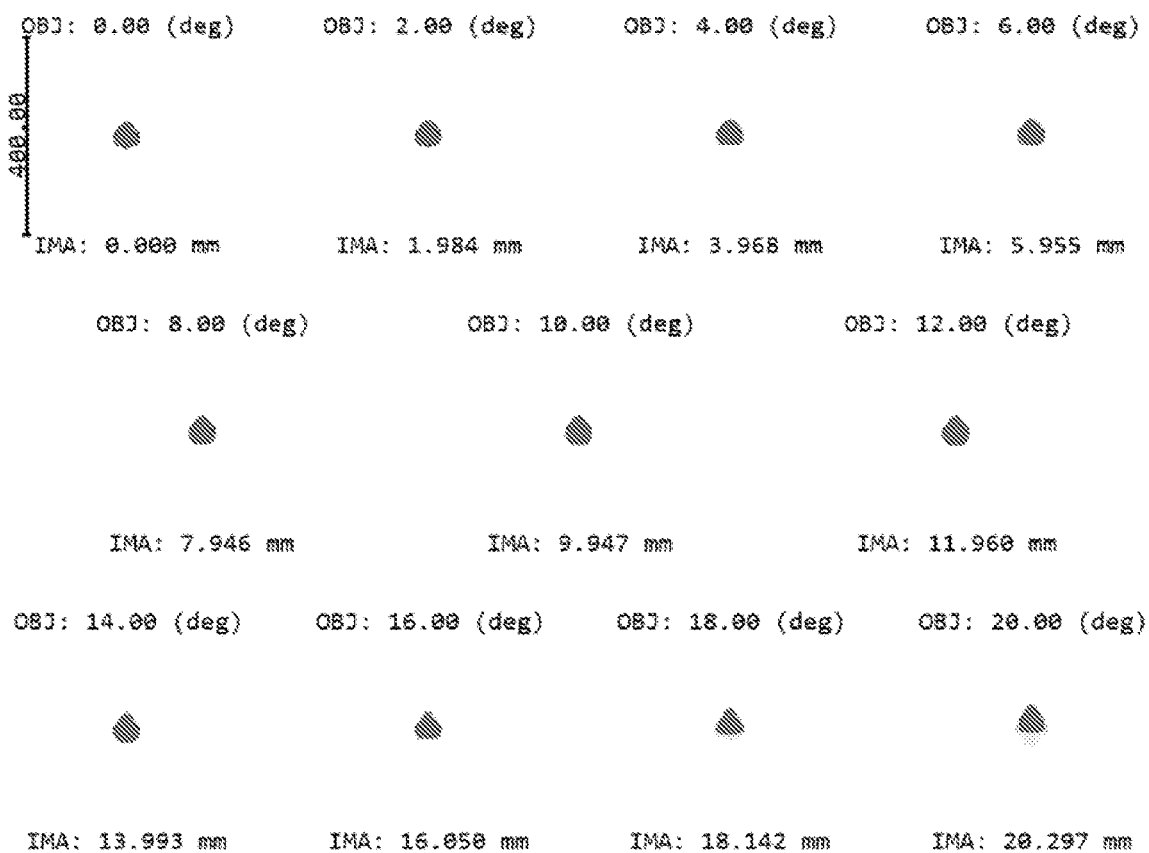
FIG. 34 is a spot array diagram of the eyepiece optical system according to Example 5 of the present invention.
Figure 35A:
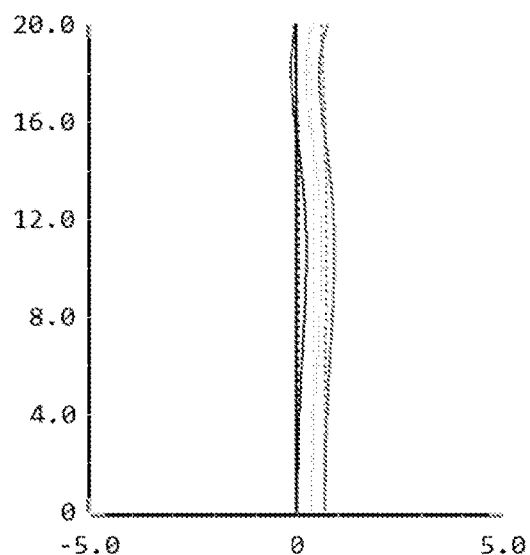
FIG. 35A is a plot of the field of the eyepiece optical system according to Example 5 of the present invention.
Figure 35B:
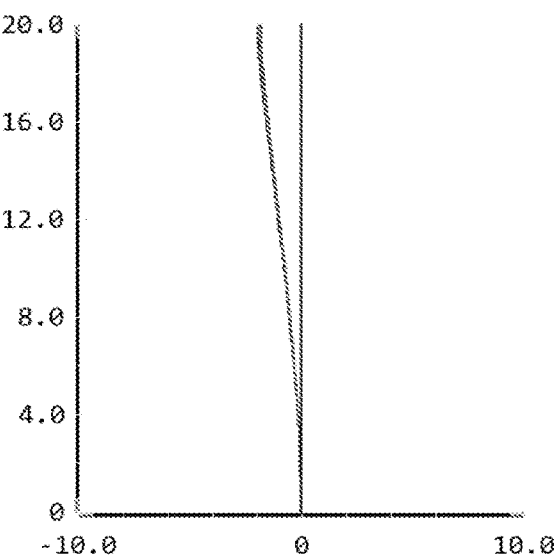
FIG. 35B is a plot of the distortion of the eyepiece optical system according to Example 5 of the present invention.
Figure 36:
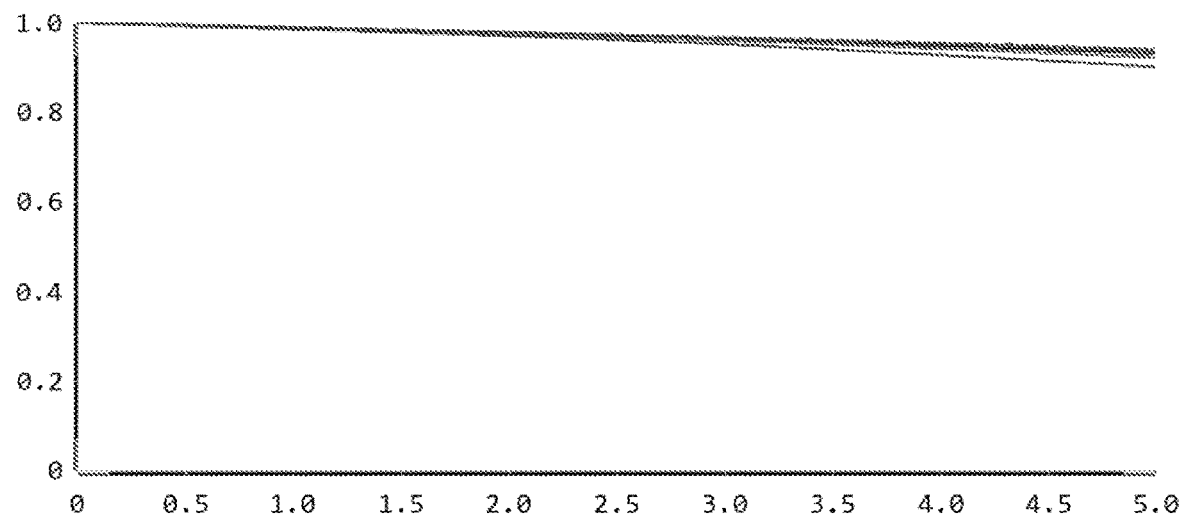
FIG. 36 is a plot of the MTF of the 700-degree myopia eyepiece optical system according to Example 5 of the present invention.

FIG. 33 is a 2D diagram of an optical structure of a zooming process according to Example 5, including the first lens group T1, the second lens group T2, and the third lens group T3 which are sequentially arranged from the human eye EYE side to the micro image display IMG in the optical axis direction. The first lens group T1 is the positive lens group, and the second lens group T2 is a negative lens group. The first lens group T1 is fixed relative to the human eye EYE. When the focal length of the optical system is increased, the second lens group T2 and the third lens group T3 being the negative lens groups move towards the human eye EYE side, as shown in FIG. 33 and Table 9 and Table 10. From C to B to A, the distance between the first lens group T1 and the second lens group T2 is reduced, the distance between the third lens group T3 and the micro image display IMG is increased, and the distance between the second lens group T2 and the third lens group T3 is reduced. The first lens group T1 in the optical system is composed of a first lens T11 of a biconvex positive lens and a second lens T12 of a meniscus negative lens. The second lens group T2 is composed of a third lens T21 of a biconcave negative lens, and the material thereof is EP4000. The third lens group is composed of a fourth lens T31 of a meniscus lens. The maximum focal length $f_{w(MAX)}$ of the optical system is 83.13, the minimum focal length $f_{w(MIN)}$ is 59.55, $D_w$ is 54.13, the focal length $f_1$ of the first lens group T1 is 29.6, the focal length $f_{11}$ of the first lens T11 is 59.01, the focal length $f_2$ of the second lens group T2 is −43.43, and the focal length $f_3$ of the third lens group T3 is −236.12. Therefore, the relations of $f_w$, $f_1$, $f_2$, and $f_3$ are that $f_1/f_{w(MAX)}$ is 0.36, $f_1/f_{w(MIN)}$ is 0.50, $f_2/f_{w(MAX)}$ is −0.522, $f_2/f_{w(MIN)}$ is −0.73, $f_3/f_{w(MAX)}$ −2.84, $f_3/f_{w(MIN)}$ is −3.96, $f_1/f_2$ is −0.68, $f_w/D_{w(MAX)}$ is 1.54, $f_w/D_{w(MIN)}$ is 1.1, $f_1/f_2$ is −0.68, and $f_{11}/f_1$ is 1.99. The distance $D_{12}$ and the distance $D_{23}$ are $D_{120}$ and $D_{230}$ respectively in a 0-diopter correction state of the eyepiece optical system, and are $D_{12X}$ and $D_{23X}$ respectively in an X-diopter correction state of the eyepiece optical system. The maximum value of $(D_{23X}−D_{230})/(D_{12X}−D_{120})$ is 1.22 and the minimum value is 1. The curvature radius $R_{130}$ of an optical surface of the fourth lens T31, far from of the micro image display IMG, in the third lens group T3 is −13.68, and the curvature radius $R_{131}$ of an optical surface close to the micro image display IMG is −19.07, and $R_{130}/R_{131}$ is 0.72. The curvature radius $R_{110}$ of an optical surface the first lens T11, far from of the micro image display IMG, in the first lens group T1 is 39.18, the curvature radius $R_{111}$ of the optical surface close to of the micro image display IMG is −371.3, and $|R_{110}/R_{111}|$ is 0.10.

Figure 37:
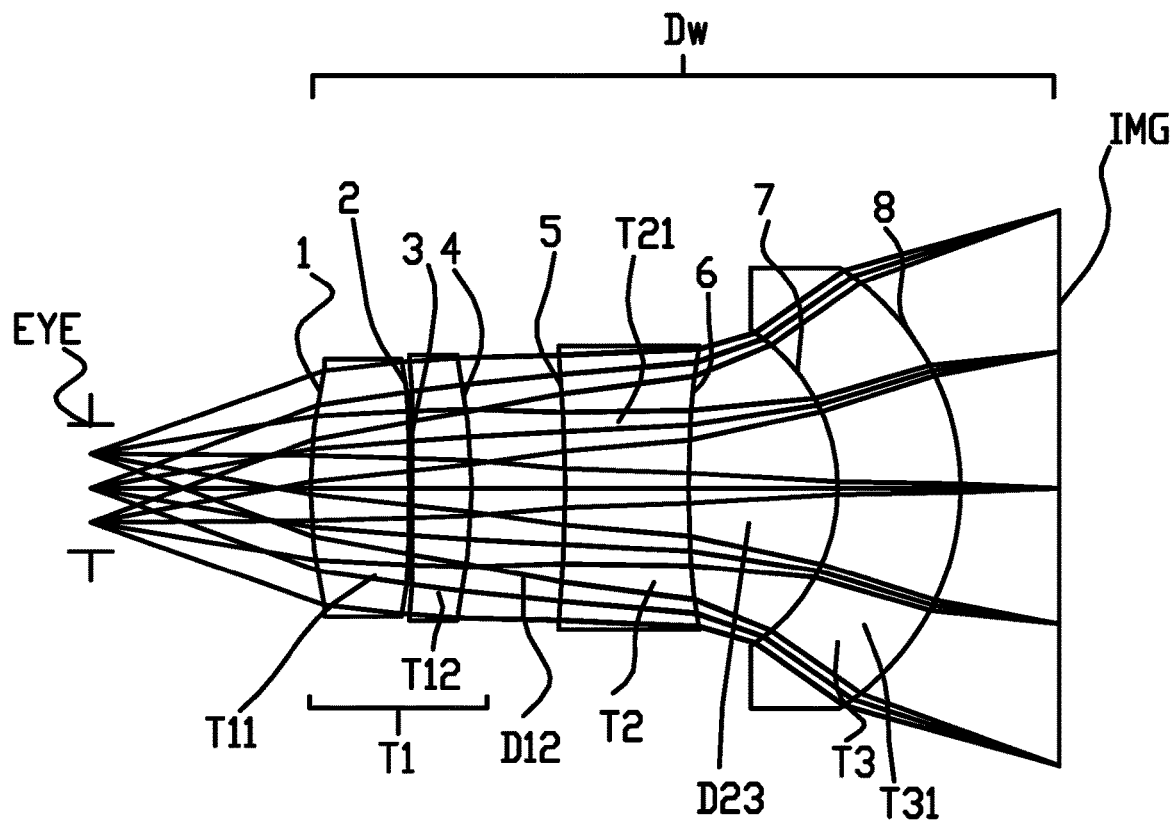
FIG. 37 is an optical path diagram of a 300-degree myopia eyepiece optical system according to Example 5 of the present invention.
Figure 38:
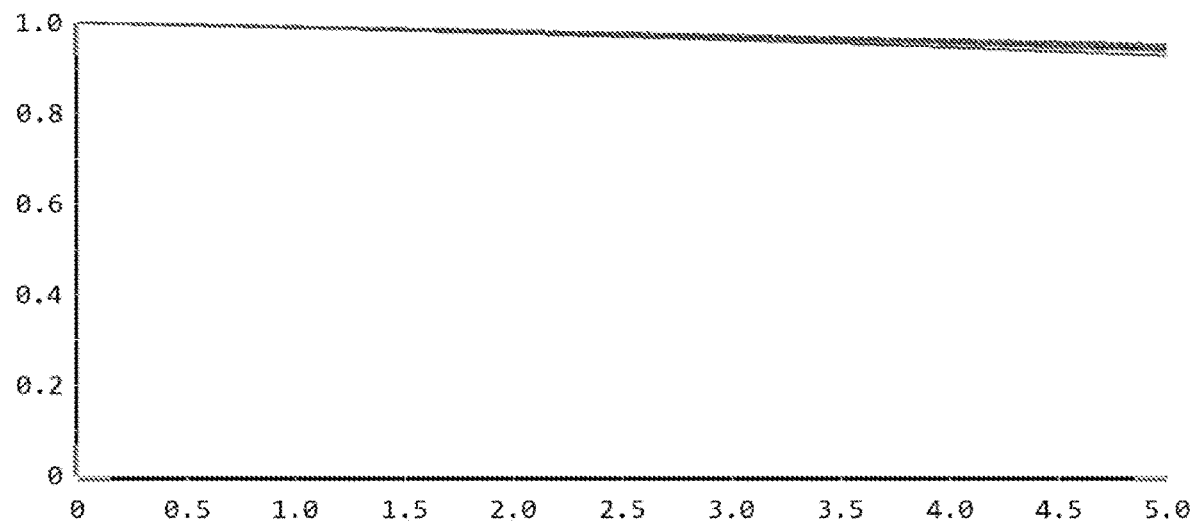
FIG. 38 is a plot of the MTF of the 300-degree myopia eyepiece optical system according to Example 5 of the present invention.
Figure 39:
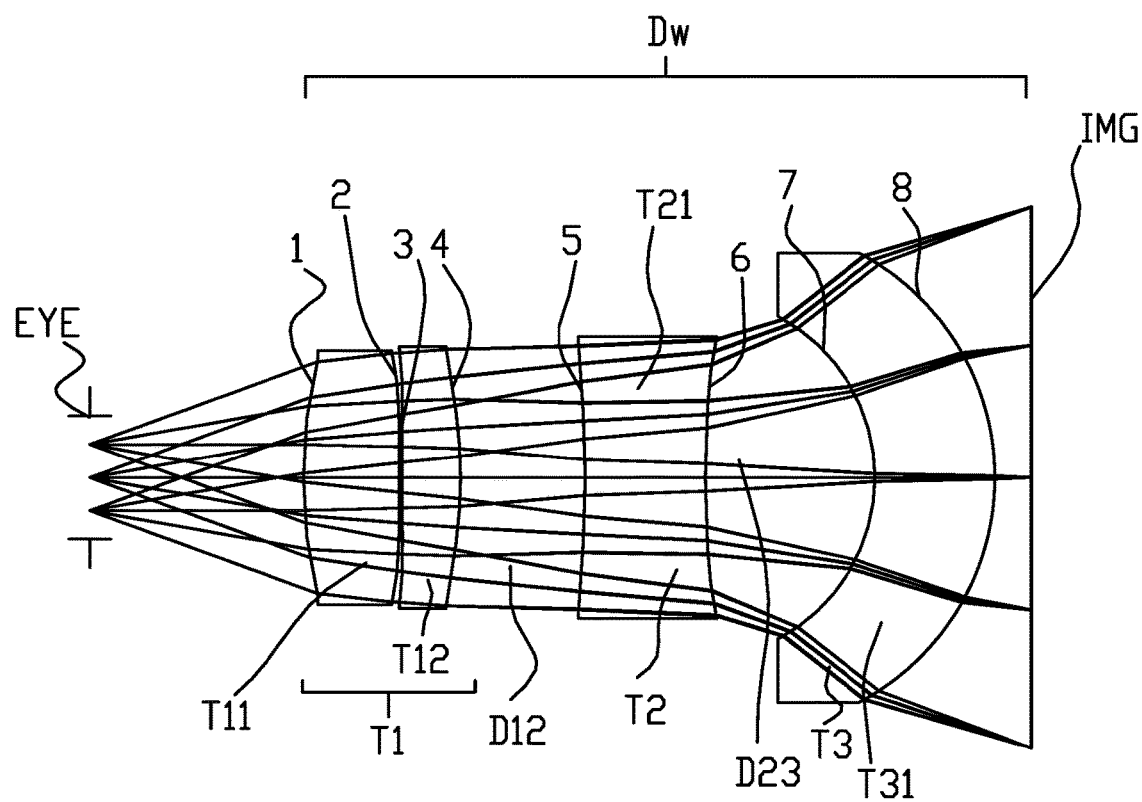
FIG. 39 is an optical path diagram of a 0-diopter eyepiece optical system according to Example 5 of the present invention.
Figure 40:
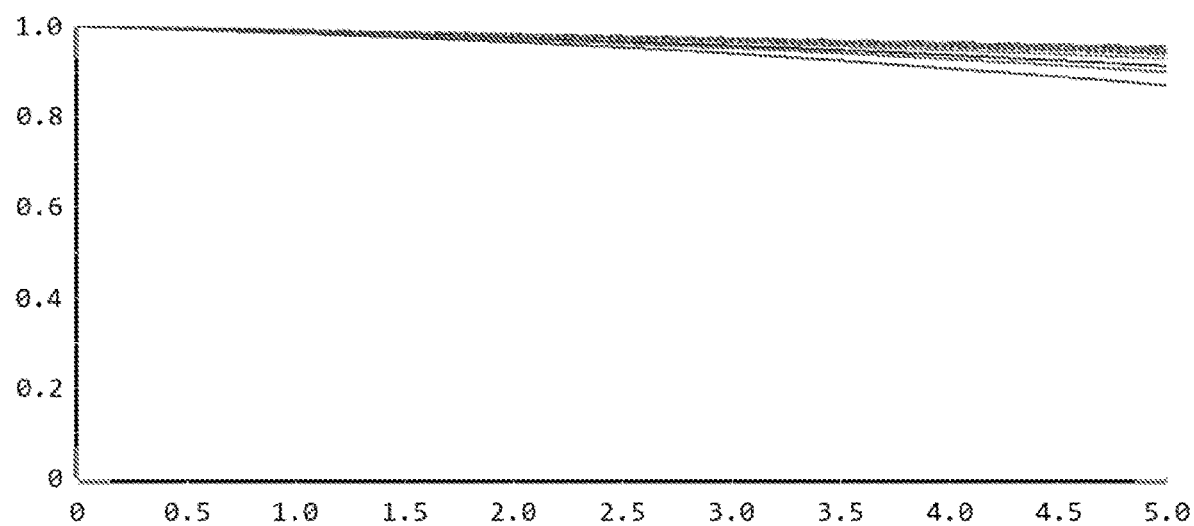
FIG. 40 is a plot of the MTF of the 0-diopter eyepiece optical system according to Example 5 of the present invention.

FIG. 34, FIG. 35A, FIG. 35B, and FIG. 36 are respectively a spot array diagram, a plot of the transfer function MTF, a plot of the field, and a plot of the distortion of the optical system at myopia of 700 degrees, FIG. 37 and FIG. 38 are an optical structure diagram and a plot of the transfer function MTF at myopia of 300 degrees, and FIG. 39 and FIG. 40 are an optical structure diagram and a plot of the transfer function MTF at a 0-diopter, which reflect that respective field-of-view light in this example has high resolution and very small optical distortion in the unit pixel of the image plane (micro image display IMG), the resolution per 5 mm per unit period reaches more than 0.8, the aberration of the optical system and the image drift are well corrected, and a display image of uniformity and high optical performance can be observed through the eyepiece optical system..

The data of the above-mentioned Examples 1 to 5 all satisfy the parameter requirements recorded in the Summary of the present invention, and the results are shown in the following Table 11:

TABLE 11

| | Example 1 | Example 2 | Example 3 | Example 4 | Example 5 |
|---|---|---|---|---|---|
| $f_1/f_{w(max)}$ | 0.32 | 0.41 | 0.47 | 0.61 | 0.36 |
| $f_1/f_{w(min)}$ | 0.41 | 0.50 | 0.59 | 0.53 | 0.50 |
| $f_2/f_{w(max)}$ | −0.46 | −0.75 | −0.83 | −3.38 | −0.52 |
| $f_2/f_{w(min)}$ | −0.58 | −0.92 | −1.04 | −2.93 | −0.73 |
| $f_3/f_{w(max)}$ | −7.27 | −5.07 | −7.27 | −4.61 | −2.84 |
| $f_3/f_{w(min)}$ | −9.15 | −6.20 | −9.15 | −3.99 | −3.97 |
| $f_1/f_2$ | −0.70 | −0.54 | −0.57 | −0.18 | −0.68 |
| $f_{11}/f_1$ | 1.17 | — | 0.82 | 0.47 | 1.99 |
| $f_{w(max)}/D_w$ | 1.39 | 1.31 | 1.39 | 1.02 | 1.54 |
| $f_{w(min)}/D_w$ | 1.1 | 1.07 | 1.10 | 1.17 | 1.10 |

The present invention further provides a head-mounted display device, including a micro image display and an eyepiece, wherein the eyepiece is located between human eyes and the micro image display, and the eyepiece is the eyepiece optical system according to any one of the foregoing contents.

Preferably, the micro image display is an organic electroluminescence light-emitting device.

Preferably, the head-mounted display device includes two identical and symmetrically arranged eyepiece optical systems.

In the specific implementation and application process, the display content on the micro image display is viewed respectively by left and right eyes of an observer through the eyepiece optical system, thereby forming a clear and enlarged visual experience. The observer can adjust the second lens group and the third lens group to move the second lens group and the third lens group towards the human eye side, therefore, the distance between the first lens group and the second lens group is reduced, the distance between the third lens group and the micro image display is increased, while the distance between the second lens group and the third lens group is reduced. By means of optical zooming, users having different diopters can focus at fixed points according to usage situations of specific users. The problem of image offset in the zooming process is avoided under the action of the third lens group, such that the user can observe a picture consistent with that observed by others.

It should be understood that, for one of ordinary skill in the art, the foregoing description can be modified or altered, and all such modifications and alterations fall into the scope of the attached claims of the present invention.

What is claimed is:

1. A diopter-adjustable eyepiece optical system, comprising a first lens group, a second lens group, and a third lens group which are sequentially arranged from a human eye observation side to a micro image display in an optical axis direction; an effective focal length of the first lens group is set to $f_1$, wherein $f_1$ is a positive value; the effective focal length of the second lens group is set to $f_2$, wherein $f_2$ is a negative value; and an optical surface, close to the side of the micro image display, in the third lens group protrudes towards a direction of the micro image display;

the first lens group is fixed relative to human eyes; and when a focal length of the optical system is increased, the second lens group and the third lens group move towards a direction of the human eyes along the optical axis;

an effective focal length of the third lens group is set to $f_3$; an effective focal length of the optical system is set to $f_w$, and $f_1$, $f_2$, $f_3$, and $f_w$ satisfy the following relations (1), (2), and (3):

$$0.32 \leq f_1/f_w \leq 0.61 \quad (1);$$

$$-3.38 \leq f_2/f_w \leq -0.47 \quad (2); \text{ and}$$

$$2.84 \leq |f_3/f_w| \quad (3).$$

2. The diopter-adjustable eyepiece optical system according to claim 1, wherein the effective focal length of the first lens group is $f_1$, the effective focal length of the second lens group is $f_2$, and $f_1$ and $f_2$ satisfy the following relation (4):

$$-0.18 \leq f_1/f_2 \leq -0.70 \quad (4).$$

3. The diopter-adjustable eyepiece optical system according to claim 1, wherein a distance between an optical surface, close to the human eye side, in the first lens group and the micro image display in the optical axis direction of the system is set to $D_w$, the effective focal length of the optical system is set to $f_w$, and $D_w$ and $f_w$ satisfy the following relation (5):

$$1.02 \leq f_w/D_w \leq 1.54 \quad (5).$$

4. The diopter-adjustable eyepiece optical system according to claim 1, wherein a distance between the first lens group and the second lens group in the optical axis direction of the system is set to $D_{12}$; a distance between the second lens group and the third lens group in the optical axis direction of the system is set to $D_{23}$; wherein in a 0-diopter correction state of the eyepiece optical system, the distance between the first lens group and the second lens group in the optical axis direction of the system is set to $D_{120}$, and the distance between the second lens group and the third lens group in the optical axis direction of the system is set to $D_{230}$;

in an X-diopter correction state of the eyepiece optical system, the distance between the first lens group and the second lens group in the optical axis direction of the system is set to $D_{12X}$, and the distance between the second lens group and the third lens group in the optical axis direction of the system is set to $D_{23X}$, and $D_{120}$, $D_{230}$, $D_{12X}$, and $D_{23X}$ satisfy the following relation (6):

$$0.78 \leq (D_{23X} \times D_{230})/(D_{12X} \times D_{120}) \leq 2.74 \quad (6).$$

5. The diopter-adjustable eyepiece optical system according to claim 1, wherein the first lens group comprises a first lens; and the first lens is a biconvex positive lens.

6. The diopter-adjustable eyepiece optical system according to claim 1, wherein the first lens group comprises a first lens and a second lens, and the first lens is a biconvex positive lens;

the effective focal length of the first lens is set to $f_{11}$, the effective focal length of the first lens group is $f_1$, and $f_{11}$ and $f_1$ satisfy the following relation (7):

$$0.468 \leq f_{11}/f_1 \quad (7).$$

7. The diopter-adjustable eyepiece optical system according to claim 5, wherein the material of the second lens is optical resin; and material properties of the second lens satisfy the following relation (8):

$$V_{d1} \leq 31 \quad (8);$$

wherein, the $V_{d1}$ is an Abbe number of the second lens on a line d.

8. The diopter-adjustable eyepiece optical system according to claim 5, wherein the curvature radius of the optical surface, close to the human eye side, in the first lens is set to $R_{110}$, the curvature radius of the optical surface, close to the side of the micro image display, in the first lens is set to $R_{111}$, and $R_{110}$ and $R_{111}$ satisfy the following relation (9):

$$0.1 \leq |R_{110}/R_{111}| \leq 1.83 \quad (9).$$

9. The diopter-adjustable eyepiece optical system according to claim 1, wherein the second lens group comprises a third lens; and the third lens is a negative lens.

10. The diopter-adjustable eyepiece optical system according to claim 1, wherein the third lens group comprises a fourth lens; the curvature radius of an optical surface, far from the side of the micro image display, in the fourth lens is set to $R_{130}$, and the curvature radius of an optical surface, close to the side of the micro image display, in the fourth lens is set to $R_{131}$, and $R_{130}$ and $R_{131}$ satisfy the following relation (10):

$$0.71 \leq R_{130}/R_{131} \leq 0.80 \quad (10).$$

11. The diopter-adjustable eyepiece optical system according to claim 10, wherein material properties of the fourth lens satisfy the following relations (11) and (12):

$$N_{d3} \geq 1.80 \quad (11); \text{ and}$$

$$V_{d3} \leq 41 \quad (12);$$

wherein the $N_{d3}$ is the refractive index of the fourth lens on the line d; and the $V_{d3}$ is an Abbe number of the fourth lens on the line d.

12. The diopter-adjustable eyepiece optical system according to claim 1, wherein the first lens group and the second lens group comprise one or more even-order aspherical face shapes; and the even-order aspherical face shape satisfies the following relation (13):

$$z = \frac{cr^2}{1 + \sqrt{1-(1+k)c^2r^2}} + \alpha_2 r^2 + \alpha_4 r^4 + \alpha_6 r^6 + \ldots . \quad (13)$$

13. A head-mounted display device, comprising a micro image display and an eyepiece, wherein the eyepiece is located between human eyes and the micro image display, and the eyepiece is the eyepiece optical system according to claim 1.

14. The head-mounted display device according to claim 13, wherein the micro image display is an organic electroluminescence light-emitting device.

15. The head-mounted display device according to claim 13, wherein the head-mounted display device comprises two identical and symmetrically arranged eyepiece optical systems.

* * * * *